(12) United States Patent
Sasaki

(10) Patent No.: US 6,470,565 B1
(45) Date of Patent: Oct. 29, 2002

(54) METHOD OF MANUFACTURING SLIDER OF THIN-FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 231 days.

(21) Appl. No.: 09/685,947

(22) Filed: Oct. 12, 2000

(30) Foreign Application Priority Data

Feb. 22, 2000 (JP) ........................................ 2000-044912
Mar. 6, 2000 (JP) ........................................ 2000-060879

(51) Int. Cl.[7] ............................................. G11B 5/127
(52) U.S. Cl. ............................... 29/603.12; 29/603.18; 360/235.4
(58) Field of Search .................... 29/603.07, 603.12, 29/603.16, 603.18; 360/234.3, 235.4; 216/22

(56) References Cited

U.S. PATENT DOCUMENTS

| 5,567,331 A | * | 10/1996 | Kajitani ........................ 216/22 |
| 5,617,273 A | | 4/1997 | Carr et al. |
| 5,841,608 A | | 11/1998 | Kasamatsu et al. |
| 5,897,984 A | * | 4/1999 | Kubota et al. ................ 216/22 |
| 6,287,475 B1 | * | 9/2001 | Fukushima et al. .......... 216/22 |
| 6,405,426 B1 | * | 6/2002 | Kondo .................... 29/603.12 |

FOREIGN PATENT DOCUMENTS

| JP | 7-230615 | 8/1995 |
| JP | 8-293111 | 11/1996 |
| JP | 8-339511 | 12/1996 |
| JP | 9-63027 | 3/1997 |
| JP | 11-120528 | 4/1999 |
| JP | 11-185418 | 7/1999 |
| JP | 8-287440 | 11/1999 |

* cited by examiner

*Primary Examiner*—Robert M. Fetsuga
*Assistant Examiner*—Peter deVore
(74) *Attorney, Agent, or Firm*—Oliff & Berridge, PLC

(57) ABSTRACT

A method of manufacturing a slider includes the steps of forming an air bearing surface of a slider material including a thin-film magnetic head element; and etching a part of the air bearing surface, such that a portion of the air bearing surface corresponding to the head element and the rest of the air bearing surface are located in one plane, or such that this portion of the air bearing surface is located closer to a recording medium than the rest of the air bearing surface.

17 Claims, 18 Drawing Sheets

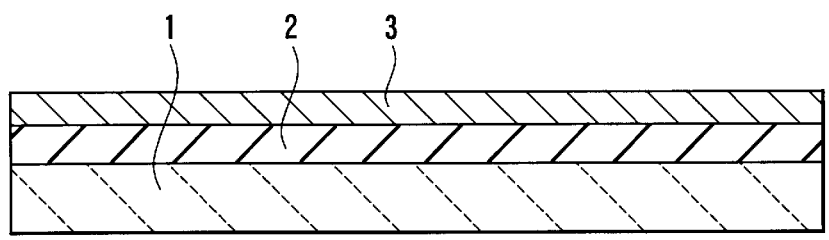
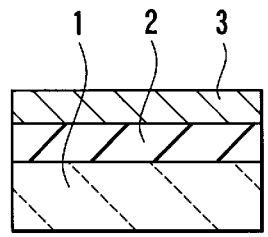
FIG. 1A  FIG. 1B
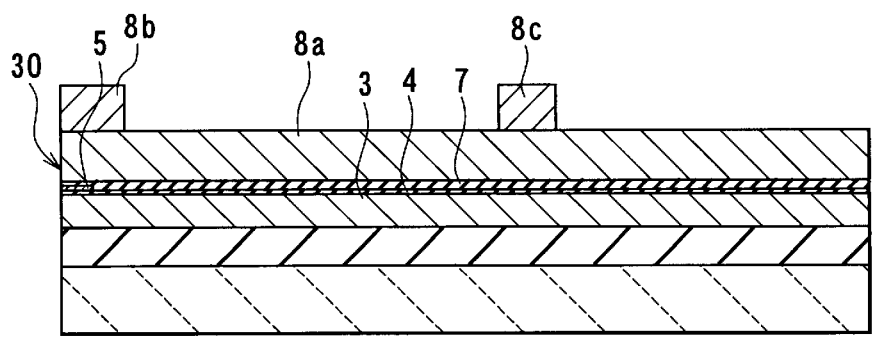
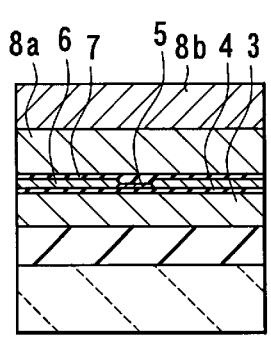
FIG. 2A  FIG. 2B

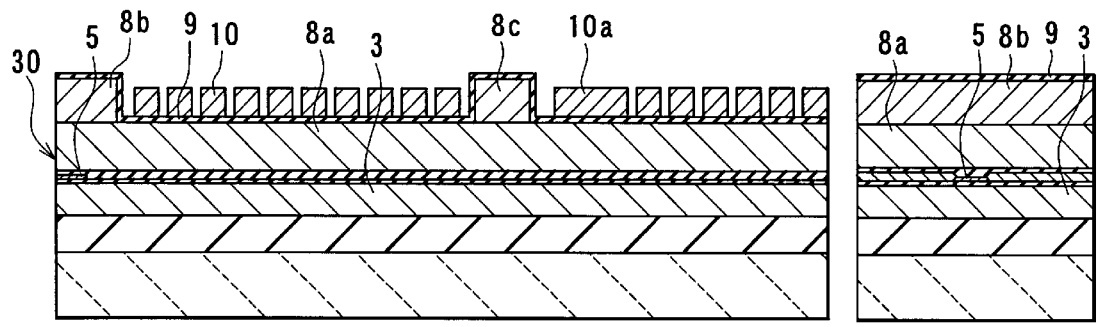 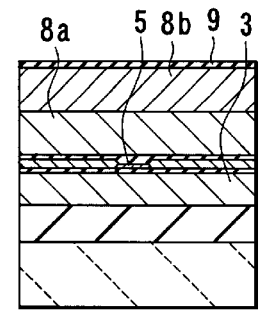
FIG. 3A    FIG. 3B
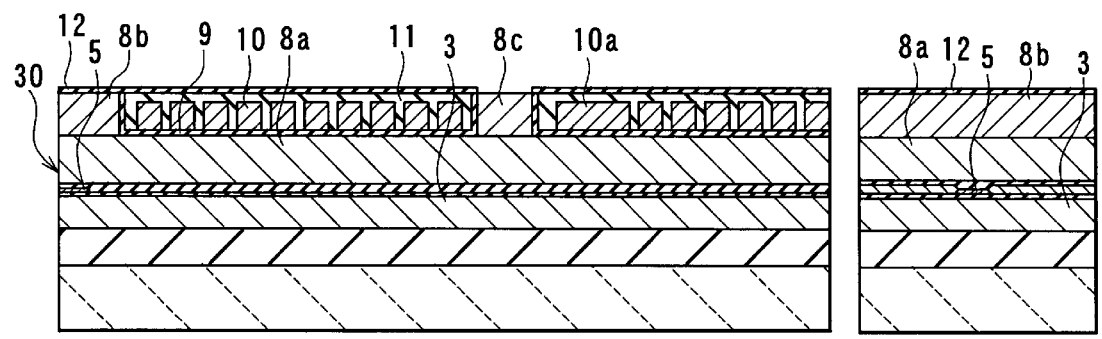 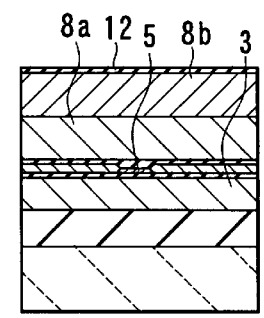
FIG. 4A    FIG. 4B

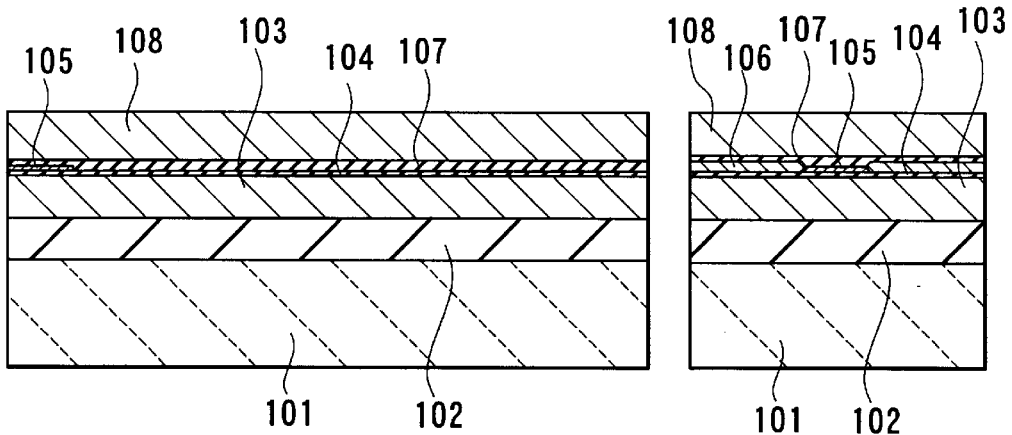
FIG. 23A
RELATED ART
FIG. 23B
RELATED ART
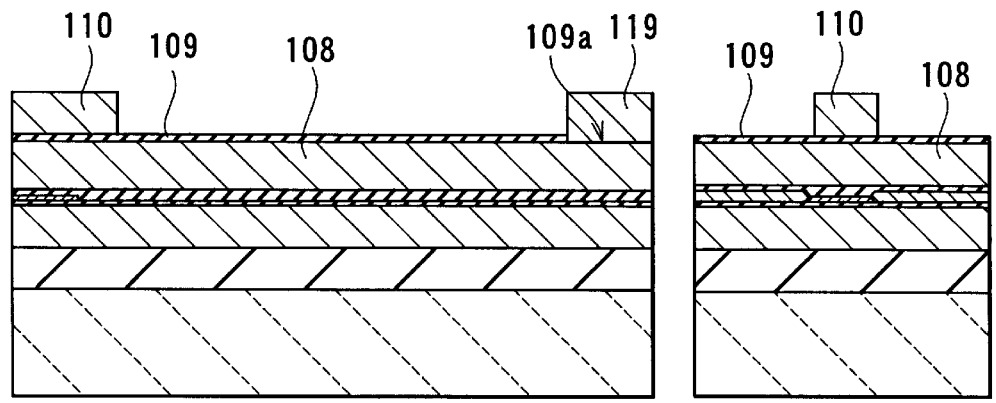
FIG. 24A
RELATED ART
FIG. 24B
RELATED ART

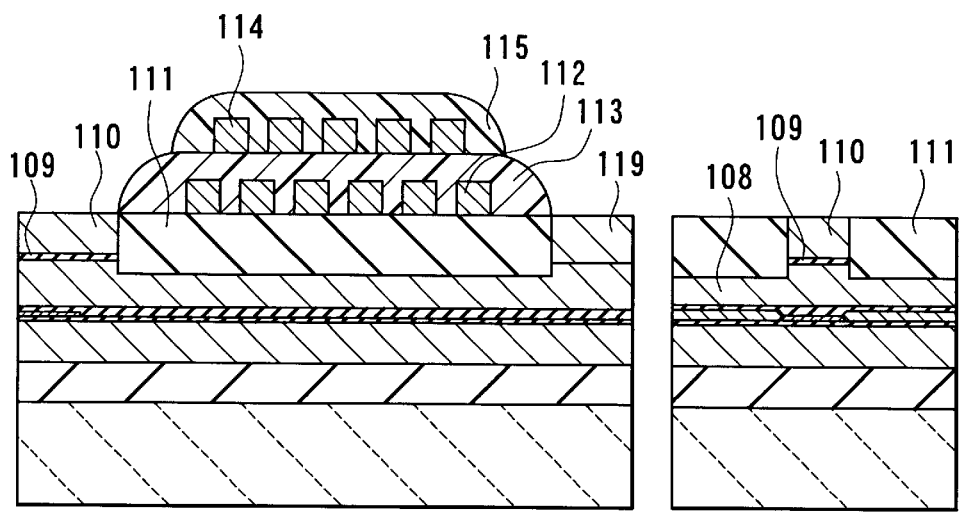
FIG. 25A
RELATED ART
FIG. 25B
RELATED ART
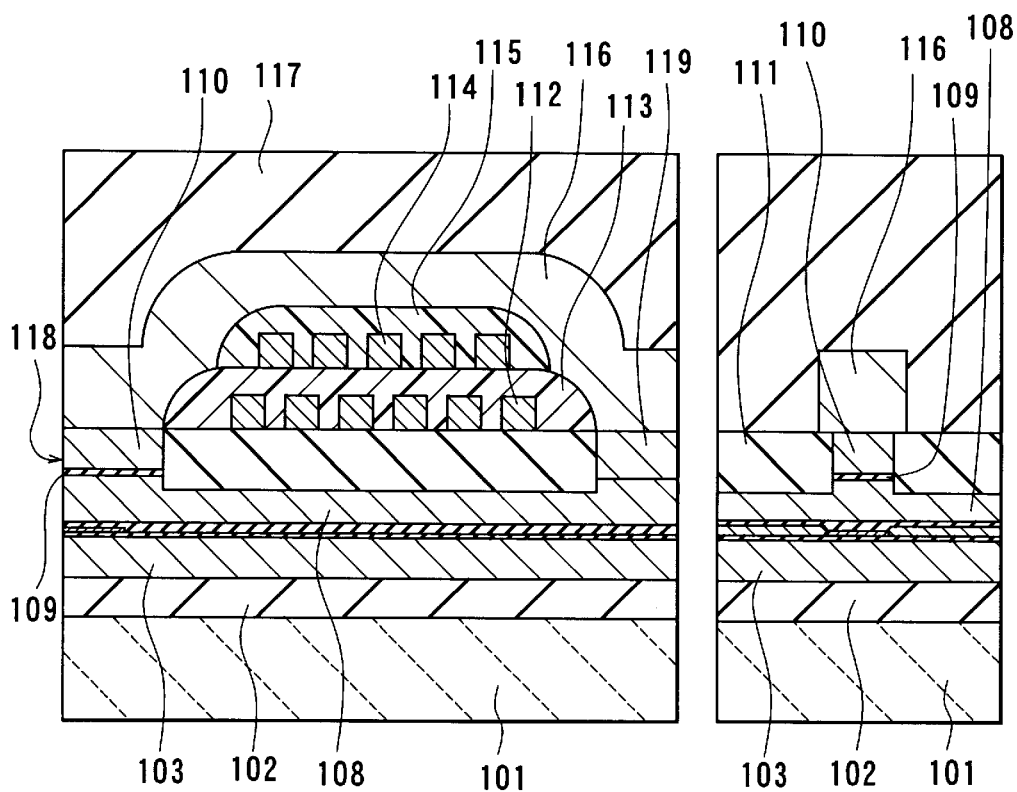
FIG. 26A
RELATED ART
FIG. 26B
RELATED ART

METHOD OF MANUFACTURING SLIDER OF THIN-FILM MAGNETIC HEAD

BACKGROUND OF THE INVENTION

1. Field of the Invention

The present invention relates to a method of manufacturing a slider of a thin-film magnetic head which comprises a medium facing surface that faces toward a recording medium and a thin-film magnetic head element located near the medium facing surface.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head where areal density is more than 1 gigabit per square inch. A GMR head is used as a reproducing head where areal density is more than 3 gigabits per square inch. It is GMR heads that have been most widely used recently.

The performance of the reproducing head is improved by replacing the AMR film with a GMR film and the like having an excellent magnetoresistive sensitivity. Alternatively, a pattern width such as the reproducing track width and the MR height, in particular, may be optimized. The MR height is the length (height) between an end of the MR element located in the air bearing surface and the other end. The air bearing surface is a surface of the thin-film magnetic head facing toward a magnetic recording medium.

Performance improvements in a recording head are also required as the performance of a reproducing head is improved. It is required to increase the linear density in order to increase the areal density among the performance characteristics of the recording head. To achieve this, it is required to implement a recording head of a narrow track structure wherein the width of top and bottom poles sandwiching the recording gap layer on a side of the air bearing surface is reduced down to microns or a submicron order. This width is one of the factors that determine the recording head performance. Semiconductor process techniques are utilized to implement such a structure. Another factor is a pattern width such as the throat height, in particular. The throat height is the length (height) of pole portions, that is, portions of magnetic pole layers facing each other with a recording gap layer in between, between the air-bearing-surface-side end and the other end. A reduction in throat height is desired in order to improve the recording head performance. The throat height is controlled by an amount of lapping when the air bearing surface is processed.

As thus described, it is important to fabricate well-balanced recording and reproducing heads to improve the performance of the thin-film magnetic head.

In order to implement a thin-film magnetic head that achieves high recording density, the requirements for the reproducing head include a reduction in reproducing track width, an increase in reproducing output, and a reduction in noise. The requirements for the recording head include a reduction in recording track width, an improvement in overwrite property that is a parameter indicating one of characteristics when data is written over existing data, and an improvement in nonlinear transition shift (NLTS).

In general, a flying-type thin-film magnetic head used in a hard disk device and the like is made up of a slider, a thin-film magnetic head element being formed at the trailing edge of the slider. The slider slightly floats over a recording medium by means of the airflow generated by the rotation of the medium.

Reference is now made to FIG. 23A to FIG. 26A, FIG. 23B to FIG. 26B, and FIG. 27 to describe an example of a manufacturing method of a related-art thin-film magnetic head element. FIG. 23A to FIG. 26A are cross sections each orthogonal to the air bearing surface. FIG. 23B to FIG. 26B are cross sections of the pole portion each parallel to the air bearing surface.

According to the manufacturing method, as shown in FIG. 23A and FIG. 23B, an insulating layer 102 made of alumina ($Al_2O_3$), for example, having a thickness of about 5 to 10 μm, is deposited on a substrate 101 made of aluminum oxide and titanium carbide ($Al_2O_3$—TiC), for example. Next, on the insulating layer 102, a bottom shield layer 103 made of a magnetic material is formed for a reproducing head.

Next, a bottom shield gap film 104 made of an insulating material such as alumina and having a thickness of 100 to 200 nm, for example, is formed through sputtering on the bottom shield layer 103. On the bottom shield gap film 104, an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 made of an insulating material such as alumina is formed through sputtering, for example, on the bottom shield gap film 104, the MR element 105 and the electrode layers 106. The MR element 105 is embedded in the shield gap films 104 and 107.

Next, on the top shield gap film 107, a top-shield-layer-cum-bottom-pole-layer (called a bottom pole layer in the following description) 108 is formed. The bottom pole layer 108 has a thickness of about 3 μm and is made of a magnetic material and used for both the reproducing head and the recording head.

Next, as shown in FIG. 24A and FIG. 24B, a recording gap layer 109 made of an insulating film such as an alumina film and having a thickness of 0.2 μm is formed on the bottom pole layer 108. Next, the recording gap layer 109 is partially etched to form a contact hole 109a for making a magnetic path. Next, a top pole tip 110 for the recording head is formed on the recording gap layer 109 in the pole portion. The top pole tip 110 is made of a magnetic material and has a thickness of 0.5 to 1.0 μm. At the same time, a magnetic layer 119 made of a magnetic material is formed for making the magnetic path in the contact hole 109a for making the magnetic path.

Next, as shown in FIG. 25A and FIG. 25B, the recording gap layer 109 and the bottom pole layer 108 are etched through ion milling, using the top pole tip 110 as a mask. As shown in FIG. 25B, the structure is called a trim structure wherein the sidewalls of the top pole portion (the top pole tip 110), the recording gap layer 109, and a part of the bottom pole layer 108 are formed vertically in a self-aligned manner.

Next, an insulating layer 111 of alumina, for example, having a thickness of about 3 Jim is formed over the entire surface. The insulating layer 111 is polished to the surfaces of the top pole tip 110 and the magnetic layer 119 and flattened.

On the flattened insulating layer 111 a first layer 112 of a thin-film coil is made for the induction-type recording head. The thin-film coil 112 is made of copper (Cu), for example. Next, a photoresist layer 113 is formed into a specific shape on the insulating layer 111 and the first layer 112 of the coil. Heat treatment is performed at a specific temperature to flatten the surface of the photoresist layer 113. Next, a second layer 114 of the thin-film coil is formed on the photoresist layer 113. Next, a photoresist layer 115 is formed into a specific shape on the photoresist layer 113 and the second layer 114 of the coil. Heat treatment is performed at a specific temperature to flatten the surface of the photoresist layer 115.

Next, as shown in FIG. 26A and FIG. 26B, a top pole layer 116 for the recording head is formed on the top pole tip 110, the photoresist layers 113 and 115 and the magnetic layer 119. The top pole layer 116 is made of a magnetic material such as Permalloy (NiFe). Next, an overcoat layer 117 of alumina, for example, is formed to cover the top pole layer 116. Finally, machine processing of the slider including the forgoing layers is performed to form the air bearing surface 118 of the thin-film magnetic head including the recording head and the reproducing head. The thin-film magnetic head element is thus completed.

FIG. 27 is a top view of the thin-film magnetic head element shown in FIG. 26A and FIG. 26B. The overcoat layer 117 and the other insulating layers and film are omitted in FIG. 27.

Reference is now made to FIG. 28 to FIG. 30 to describe the configuration of the slider and a method of manufacturing the same. FIG. 28 is a bottom view that illustrates an example of the configuration of the air bearing surface of the slider. As shown, the air bearing surface of the slider 120 is shaped such that the slider 120 slightly floats over a recording medium such as a magnetic disk by means of the airflow generated by the rotation of the medium. In FIG. 28 numeral 121a indicates a convex portion and numeral 121b indicates a concave portion. A thin-film magnetic head element 122 is located near the air-outflow-side end of the air bearing surface of the slider 120 (that is, on the upper side of FIG. 28). The configuration of the head element 122 is shown in FIG. 26A and FIG. 26B, for example. Portion C of FIG. 28 corresponds to FIG. 26B.

The slider 120 is fabricated as follows. A wafer includes a plurality of rows of portions to be sliders (hereinafter called slider portions) each of which includes the thin-film magnetic head element 122. This wafer is cut in one direction to form blocks called bars each of which includes a row of slider portions. Each of the bars is then lapped to form the air bearing surface. Furthermore, the convex portion 121a and the concave portion 121b are formed. Each of the bars is then divided into sliders 120.

FIG. 29 is a cross-sectional view taken along line 29–29 of FIG. 28. FIG. 29 illustrates only the main part of the thin-film magnetic head element 122. As shown, the greater part of the slider 120 is made up of the substrate 101 of aluminum oxide and titanium carbide, for example. The rest of the slider 120 is made up of the insulating layer 127 of alumina, for example, and the head element 122 and so on formed in the insulating layer 127. The greater part of the insulating layer 127 is the overcoat layer 117.

As disclosed in Published Unexamined Japanese Patent Application Hei 9-63027 (1997), for example, a protection film of a material such as diamond-like carbon (DLC) may be formed on the air bearing surface of the slider 120 in order to prevent corrosion, for example, of the bottom shield layer 103, the bottom pole layer 108, the top pole tip 110, and the top pole layer 116 and so on. FIG. 30 is a cross-sectional view that illustrates the slider 120 with a protection film 128 formed on the air bearing surface, the slider 120 slightly floating over a recording medium 140.

In order to improve the performance characteristics of a hard disk device, such as areal recording density, a method of increasing linear recording density and a method of increasing track density may be taken. To design a high-performance hard disk device, specific measures taken for implementing the recording head, the reproducing head or the thin-film magnetic head as a whole depend on whether linear recording density or track density is emphasized. That is, if priority is given to track density, a reduction in track width is required for both recording head and reproducing head, for example.

If priority is given to linear recording density, it is required for the reproducing head to improve the reproducing output and to reduce the half width of the reproducing output. Moreover, it is required to reduce the distance between the hard disk platter and the slider (hereinafter called a magnetic space). To achieve areal density of 20 to 30 gigabits per square inch, a magnetic space of 15 to 25 nm, for example, is required.

A reduction in magnetic space is achieved by reducing the amount of floating of the slider. A reduction in magnetic space not only contributes to an improvement in the reproducing output and a reduction in the half width of the reproducing output of the reproducing head, but also to an improvement in the overwrite property of the recording head.

The following is a description of the problem that arises when the magnetic space is reduced. In the prior art, lapping of the air bearing surface of the slider 120 has been performed on a rotating tin surface plate through the use of diamond slurry, for example.

A plurality of materials that make up the slider 120 have different hardnesses. For example, a comparison is made between: aluminum oxide and titanium carbide that is a ceramic material used for the substrate 101; a magnetic material such as NiFe used for the bottom shield layer 103, the bottom pole layer 108, the top pole tip 110, the top pole layer 116 and so on; and alumina used for the insulating layer 127. The hardness of aluminum oxide and titanium carbide is the greatest while that of NiFe is the smallest. The hardness of alumina is smaller than that of aluminum oxide and titanium carbide, and greater than that of NiFe.

The slider 120 includes a plurality of layers having different hardnesses as thus described. If this slider 120 is lapped on a tin surface plate through the use of diamond slurry as an abrasive, differences in level may result among the layers having different hardnesses. For example, as shown in FIG. 29, a difference of about 1 to 2 nm in level is created between the insulating layer 127 and the top pole layer 116, for example, that is a layer made of a magnetic material such as NiFe, an end of the top pole layer 116 being located behind an end of the insulating layer 127. A difference of about 4 to 5 nm in level is created between the insulating layer 127 and the substrate 101, an end of the insulating layer 127 being located behind an end of the substrate 101. In this case, the difference in level is about 5 to 7 nm between the surface of the thin-film magnetic head element 122 closer to the air bearing surface and the surface of the substrate 101 closer to the air bearing surface, the protection film 128 being excluded.

If the thickness of the protection film 128 is 5 nm, as shown in FIG. 30, the difference in level is about 10 to 12 nm between the surface of the head element 122 closer to the air bearing surface and the surface of a portion of the protection film 128 that corresponds to the substrate 101, the surface being located in the air bearing surface. If the distance between the slider 120 and the recording medium 140 when the slider 120 is flying is 10 nm, the magnetic space, that is, the distance between the medium 140 and the surface of the head element 122 closer to the air bearing surface when the slider 120 is flying, is about 20 to 22 nm. When the magnetic space is of such a degree, attainable areal density is limited to about 30 gigabits per square inch.

As thus described, the related-art thin-film magnetic head may have a difference in level in the air bearing surface of the slider 120, the portion corresponding to the head element 122 being recessed behind the other part. As a result, it is difficult to reduce the magnetic space, and to improve the recording density.

Since it is difficult to reduce the magnetic space of the related-art thin-film magnetic head as described above, it is impossible to improve the performance of the reproducing head in particular to a sufficient degree, such as an improvement in the reproducing output and a reduction in half width of the reproducing head. As a result, the problem of the related art is that the error rate of the hard disk devices for high density recording increases and the yield of the hard disk devices decreases.

In Published Unexamined Japanese Patent Application Hei 8-339511 (1996), a method of manufacturing sliders is disclosed wherein the step of lapping the air bearing surfaces of the sliders is performed such that an insulator surrounding the member making up each thin-film magnetic head element is eroded in a more uneven manner, compared to the member making up the head element, so as to make the member protrude further than the insulator.

In this technique, however, a great difference in level is created in the air bearing surface of the slider between the insulator and the member in particular. It is therefore required to form an unnecessarily thick protection film to reduce this difference in level.

Another problem is that, if the magnetic space is reduced, the slider is likely to collide with the recording medium, and damage to the medium frequently results. To avoid this, it is required to enhance the smoothness of the surface of the medium. However, the slider easily sticks to the medium if the smoothness of the surface of the medium is enhanced.

To solve this problem, techniques are disclosed in Published Unexamined Japanese Patent Application Hei 8-287440 (1996), Published Unexamined Japanese Patent Application Hei 8-293111 (1996), and Published Unexamined Japanese Patent Application Hei 11-120528 (1999), wherein a protrusion is provided on the medium facing surface of the slider to prevent the slider from sticking to the surface of the medium. In Published Unexamined Japanese Patent Application Hei 7-230615 (1995), a technique is disclosed to flatten the flying surface of the slider, wherein a protection film made of an insulating film is provided in a recess produced between the slider and the head element when the flying surface of the slider is processed. In this publication the following first and second methods are disclosed to provide the protection film in the recess. The first method is to form a protection film through sputtering over the entire surface including the flying surface of the slider and a surface of the head element located closer to the flying surface, and to lap the flying surface of the slider so as to remove a portion of the protection film on the flying surface of the slider. The second method is to form a photosensitive organic film over the entire surface including the flying surface of the slider and a surface of the head element located closer to the flying surface; then to expose only a portion of the organic film on the surface of the head element; and then to remove the portion of the organic film. A protection film is then formed over the entire surface through sputtering, and the rest of the organic film is finally removed.

However, the technique disclosed in Published Unexamined Japanese Patent Application Hei 7-230615 has a problem that, although the flying surface, that is, the medium facing surface of the slider is flattened, it is difficult to obtain a desired shape of the medium facing surface of the slider, such as a shape in which the above-mentioned protrusion is provided on the medium facing surface.

In Published Unexamined Japanese Patent Application Hei 11-185418 (1999), a technique is disclosed to prevent the slider from sticking to the recording medium, wherein a convexity is formed on the air inflow side of the air bearing surface of the slider, and the corners of the air outflow end are removed, such that the air bearing surface forms a specific angle (but not parallel) with respect to the recording medium when the medium is at rest.

In this technique, however, although it is possible to prevent the slider from sticking to the medium, it is impossible to eliminate the difference in level in the air bearing surface between the portion corresponding to the head element and the other part. It is therefore difficult to reduce the magnetic space.

OBJECT AND SUMMARY OF THE INVENTION

It is an object of the invention to provide a method of manufacturing a slider of a thin-film magnetic head for achieving low-flying sliders, and for obtaining a desired shape of the medium facing surface of the slider.

A method of the invention is provided for manufacturing a slider of a thin-film magnetic head, the slider including a medium facing surface that faces toward a recording medium and a thin-film magnetic head element located near the medium facing surface. The method comprises the steps of forming the medium facing surface in a material used for making the slider, the material including the head element; and etching at least a part of the medium facing surface, such that a reduction is made in difference in level between a portion of the medium facing surface corresponding to the head element and the rest of the medium facing surface, or such that the portion of the medium facing surface corresponding to the head element is located closer to the recording medium than at least a portion of the rest of the medium facing surface.

According to the method of the invention, at least a part of the medium facing surface is etched. As a result, a reduction is achieved in difference in level between the portion of the medium facing surface of the slider corresponding to the head element and the rest of the medium facing surface. Alternatively, the portion of the medium facing surface is located closer to the recording medium than at least a portion of the rest of the medium facing surface.

According to the method of the invention, the step of forming the medium facing surface may include lapping of a surface of the material to be the medium facing surface.

The method of the invention may further comprise the step of forming a protection film over the medium facing surface after the step of etching. In this case, the protection film may be made of diamond-like carbon. The method of the invention may further comprise the step of forming a convex portion on the protection film.

The method of the invention may further comprise the step of forming a protection film over the medium facing surface after the step of forming the medium facing surface, wherein a portion of the protection film is etched in the step of etching. In this case, the protection film may be made of diamond-like carbon. The protection film may have a thickness greater than or equal to the difference in level between the portion of the medium facing surface before undergoing the step of etching, the portion corresponding to the head element, and at least a portion of the rest of the medium facing surface.

According to the method of the invention, a convex portion may be formed on the rest of the medium facing surface in the step of etching.

According to the method of the invention, ion milling or reactive ion etching may be used in the step of etching.

According to the method of the invention, etching may be performed through the use of focused ion beam in the step of etching. In this case, alignment of the focused ion beam may be made with reference to an end of the medium facing surface in the step of etching.

According to the method of the invention, in the step of etching with the focused ion beam, the medium facing surface may be shaped such that a portion thereof between an air-inflow-side end and an air-outflow-side end projects further toward the recording medium. In this case, in the step of etching with the focused ion beam, the medium facing surface may be shaped such that an arc is formed between the air-inflow-side end and the air-outflow-side end.

According to the method of the invention, the head element may include a magnetoresistive element, and the length of the magnetoresistive element between an end thereof located in the medium facing surface and the other end may be controlled in the step of etching with the focused ion beam.

According to the method of the invention, the head element may include: a first magnetic layer and a second magnetic layer magnetically coupled to each other each of which includes at least one layer, the first and second magnetic layers including magnetic pole portions opposed to each other and placed in regions on a side of the medium facing surface; a gap layer placed between the pole portions of the first and second magnetic layers; and a thin-film coil at least a part of which is placed between the magnetic layers and insulated from the magnetic layers. In addition, the length of the pole portions between an end thereof located in the medium facing surface and the other end may be controlled in the step of etching with the focused ion beam.

Other and further objects, features and advantages of the invention will appear more fully from the following description.

BRIEF DESCRIPTION OF THE DRAWINGS

FIG. 1A and FIG. 1B are cross sections for illustrating a step in an example of a method of manufacturing a thin-film magnetic head element.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 23A and FIG. 23B are cross sections for illustrating a step in a method of manufacturing a thin-film magnetic head element of a related art.

FIG. 24A and FIG. 24B are cross sections for illustrating a step that follows FIG. 23A and FIG. 23B.

FIG. 25A and FIG. 25B are cross sections for illustrating a step that follows FIG. 24A and FIG. 24B.

FIG. 26A and FIG. 26B are cross sections of the related-art thin-film magnetic head element.

DETAILED DESCRIPTION OF THE PREFERRED EMBODIMENTS

Figures 5A, 5B:
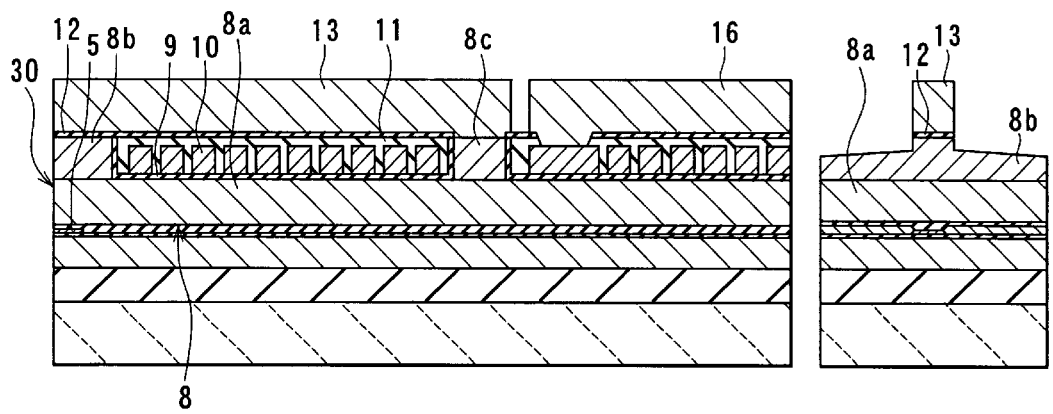
FIG. 5A and FIG. 5B are cross sections for illustrating a step that follows FIG. 4A and FIG. 4B.

Preferred embodiments of the invention will now be described in detail with reference to the accompanying drawings.

First Embodiment

A first embodiment of the invention is applied to a slider of a thin-film magnetic head (hereinafter simply called a slider). The slider has: an air bearing surface as a medium facing surface that faces toward a recording medium; and a thin-film magnetic head element located near the air bearing surface.

Reference is now made to FIG. 1A to FIG. 6A, FIG. 1B to FIG. 6B, and FIG. 7 to describe an example of a method of manufacturing the thin-film magnetic head element of the slider to which the first embodiment of the invention is applied. FIG. 1A to FIG. 6A are cross sections each orthogonal to the air bearing surface. FIG. 1B to FIG. 6B are cross sections of the pole portion of the head parallel to the air bearing surface.

In the method of this example, as shown in FIG. 1A and FIG. 1B, an insulating layer 2 made of alumina ($Al_2O_3$), for example, of about 5 µm in thickness is deposited on a substrate 1 made of aluminum oxide and titanium carbide ($Al_2O_3$—TiC), for example. Next, on the insulating layer 2, a bottom shield layer 3 is formed for the reproducing head. The bottom shield layer 3 is made of a magnetic material such as Permalloy and has a thickness of about 3 µm. The bottom shield layer 3 is selectively formed on the insulating layer 2 through plating with a photoresist film as a mask, for example. Next, although not shown, an insulating layer of alumina, for example, and having a thickness of 4 to 5 µm, for example, is formed over the entire surface. The insulating layer is then polished through chemical mechanical polishing (CMP), for example, so that the bottom shield layer 3 is exposed, and the surface is flattened.

Next, as shown in FIG. 2A and FIG. 2B, on the bottom shield layer 3, a bottom shield gap film 4 having a thickness of about 20 to 40 nm, for example, is formed as an insulating film. Next, an MR element 5 for reproduction having a thickness of tens of nanometers is formed on the bottom shield gap film 4. An end of the MR element 5 is located in the air bearing surface 30. The MR element 5 may be formed through selectively etching an MR film formed through sputtering. The MR element 5 may be an element utilizing a magneto-sensitive film that exhibits magnetoresistivity, such as an AMR element, a GMR element or a tunnel magnetoresistive (TMR) element,. Next, a pair of electrode layers 6 having a thickness of tens of nanometers are formed on the bottom shield gap film 4. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. The insulating material of the shield gap films 4 and 7 may be alumina, aluminum nitride, or diamond-like carbon (DLC). The shield gap films 4 and 7 may be formed through sputtering or chemical vapor deposition (CVD).

Next, a first layer 8a of a top-shield-layer-cum-bottom-pole-layer (hereinafter called a bottom pole layer) 8 is selectively formed on the top shield gap film 7. The bottom pole layer 8 is made of a magnetic material and used for both reproducing head and recording head. The first layer 8a has a thickness of about 1.0 to 1.5 µm. The bottom pole layer 8 is made up of the first layer 8a, and a second layer 8b and a third layer 8c described later. The first layer 8a is located to face at least a part of a thin-film coil described later.

Next, the second layer 8b and the third layer 8c of the bottom pole layer 8, each having a thickness of about 1.5 to 2.5 µm, are formed on the first layer 8a. The second layer 8b includes a pole portion of the bottom pole layer 8 and is connected to a surface of the first layer 8a that faces toward a recording gap layer described later (on the upper side of FIG. 2A and FIG. 2A). The third layer 8c is provided for connecting the first layer 8a to a top pole layer described later, and is located near the center of the thin-film coil described later. A portion of the second layer 8b facing the top pole layer has an end located farther from the air bearing surface 30. The position of this end defines the throat height.

The second layer 8b and the third layer 8c of the bottom pole layer 8 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, as shown in FIG. 3A and FIG. 3B, an insulating film 9 having a thickness of about 0.3 to 0.6 µm is formed over the entire surface.

Next, a photoresist is patterned through a photolithography process to form a frame (not shown) used for making the thin-film coil through frame plating. Next, the thin-film coil 10 made of copper (Cu), for example, is formed by frame plating through the use of the frame. For example, the thickness of the coil 10 is about 1.0 to 2.0 µm and the pitch is 1.2 to 2.0 µm. The frame is then removed. In the drawings numeral 10a indicates a portion for connecting the coil 10 to a conductive layer (lead) described later.

Next, as shown in FIG. 4A and FIG. 4B, an insulating layer 11 of alumina, for example, having a thickness of about 3 to 4 µm is formed over the entire surface. The insulating layer 11 is then polished through CMP, for example, until the second layer 8b and the third layer 8c of the bottom pole layer 8 are exposed, and the surface is flattened. Although the coil 10 is not exposed in FIG. 4A, the coil 10 may be exposed.

Next, a recording gap layer 12 made of an insulating material whose thickness is 0.2 to 0.3 µm, for example, is formed on the second layer 8b and the third layer 8c of the bottom pole layer 8 exposed and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD.

Next, a portion of the recording gap layer 12 located on top of the third layer 8c is etched to form a contact hole for making the magnetic path. Portions of the recording gap layer 12 and the insulating layer 11 that are located on top of the connecting portion 10a of the coil 10 are etched to form a contact hole.

Next, as shown in FIG. 5A and FIG. 5B, on the recording gap layer 12, a top pole layer 13 having a thickness of about 2.0 to 3.0 µm is formed in a region extending from the air bearing surface 30 to a portion on top of the third layer 8c of the bottom pole layer 8. At the same time, a conductive layer 16 having a thickness of about 2.0 to 3.0 µm is formed to be connected to the portion 10a of the thin-film coil 10. The top pole layer 13 is in contact with the third layer 8c of the bottom pole layer 8 and magnetically coupled thereto through the contact hole formed in the portion on top of the third layer 8c.

The top pole layer 13 may be made of NiFe (80 weight % Ni and 20 weight % Fe) or a high saturation flux density material such as NiFe (45 weight % Ni and 55 weight % Fe) through plating, or may be made of a material such as FeN or FeZrN as a high saturation flux density material through sputtering. Alternatively, a material such as CoFe or a Co-base amorphous material as a high saturation flux density material may be used. To improve the high frequency characteristic, the top pole layer 13 may be made of a number of layers of inorganic insulating films and magnetic layers of Permalloy, for example.

Next, the recording gap layer 12 is selectively etched through dry etching, using the top pole layer 13 as a mask. The dry etching may be reactive ion etching (RIE) using a chlorine-base gas such as $BCl_2$ or $Cl_2$, or a fluorine-base gas such as $CF_4$ or $SF_6$, for example. Next, the second layer 8b of the bottom pole layer 8 is selectively etched by about 0.3 to 0.6 µm through argon ion milling, for example. A trim structure as shown in FIG. 5B is thus formed. The trim structure suppresses an increase in the effective track width due to expansion of a magnetic flux generated during writing in a narrow track.

Figures 6A, 6B:
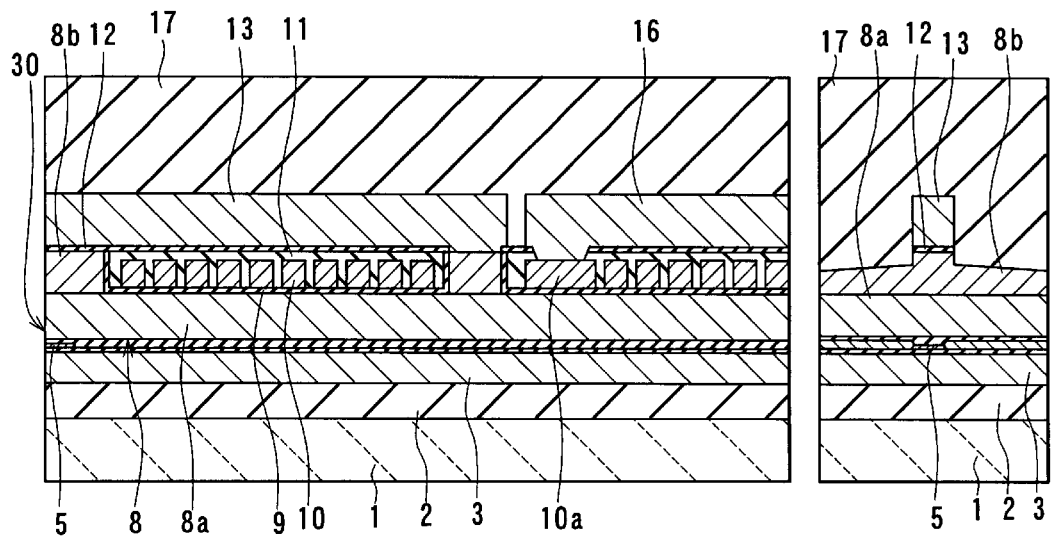
FIG. 6A and FIG. 6B are cross sections for illustrating the configuration of an example of the thin-film magnetic head element.

Next, as shown in FIG. 6A and FIG. 6B, an overcoat layer 17 of alumina, for example, having a thickness of 20 to 40 µm is formed over the entire surface. The surface of the overcoat layer 17 is then flattened and pads (not shown) for electrodes are formed on the overcoat layer 17. Finally, lapping of the slider including the foregoing layers is performed to form the air bearing surface 30 of the thin-film magnetic head including the recording head and the reproducing head. The thin-film magnetic head element is thus completed.

Figure 7:
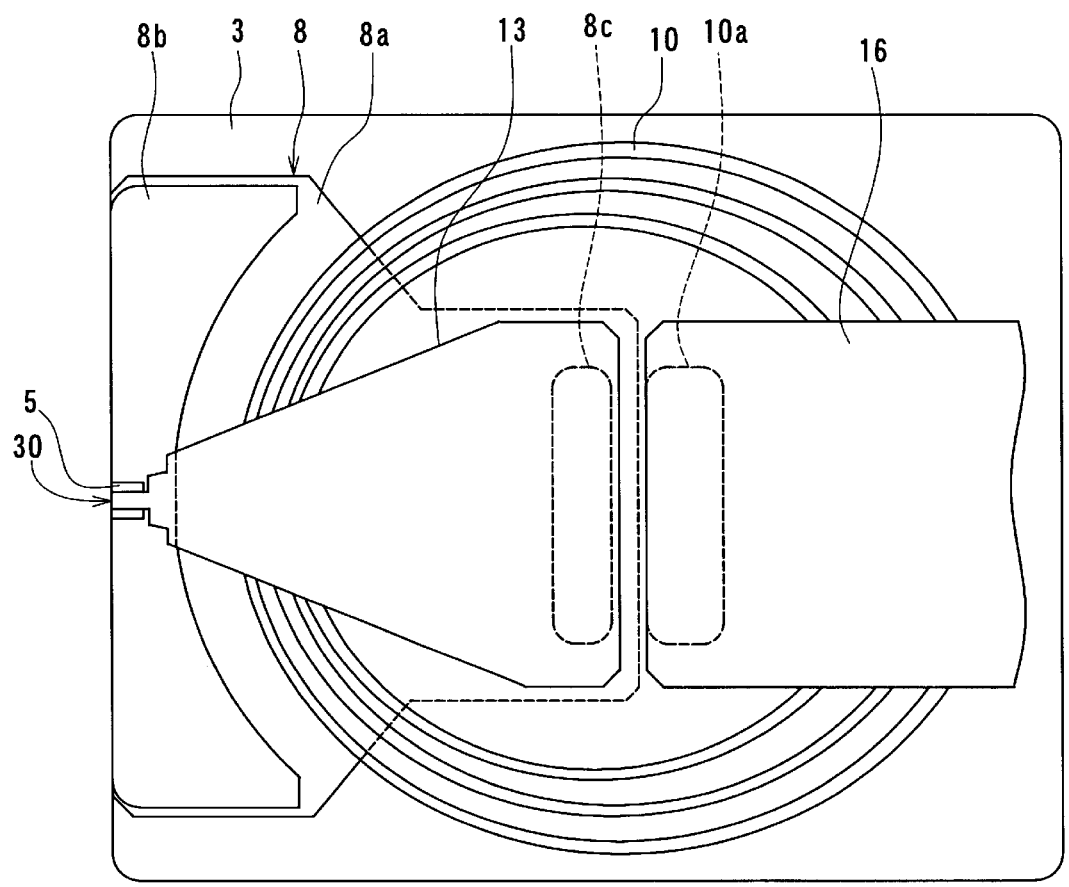
FIG. 7 is a top view of the main part of the thin-film magnetic head element shown in FIG. 6A and FIG. 6B.

FIG. 7 is a top view of the main part of the thin-film magnetic head element shown in FIG. 6A and FIG. 6B, wherein the overcoat layer 17 and the other insulating layers and films are omitted.

The thin-film magnetic head element of this example comprises the medium facing surface that faces toward a recording medium (air bearing surface 30), the reproducing head and the recording head (induction-type electromagnetic transducer). The reproducing head includes the MR element 5 and the bottom shield layer 3 and the top shield layer (bottom pole layer 8) for shielding the MR element 5. Portions of the bottom shield layer 3 and the top shield layer on a side of the air bearing surface 30 are opposed to each other while the MR element 5 is placed between these portions of the bottom shield layer 3 and the top shield layer.

The recording head includes the bottom pole layer 8 and the top pole layer 13 magnetically coupled to each other each of which includes at least one layer. The bottom pole layer 8 and the top pole layer 13 include pole portions opposed to each other and located in regions on a side of the air bearing surface 30. The recording head further includes: the recording gap layer 12 placed between the pole portion of the bottom pole layer 8 and the pole portion of the top pole layer 13; and the thin-film coil 10 at least a part of which is placed between the bottom pole layer 8 and the top pole layer 13, the at least part of the coil 10 being insulated from the bottom pole layer 8 and the top pole layer 13.

Figure 8:
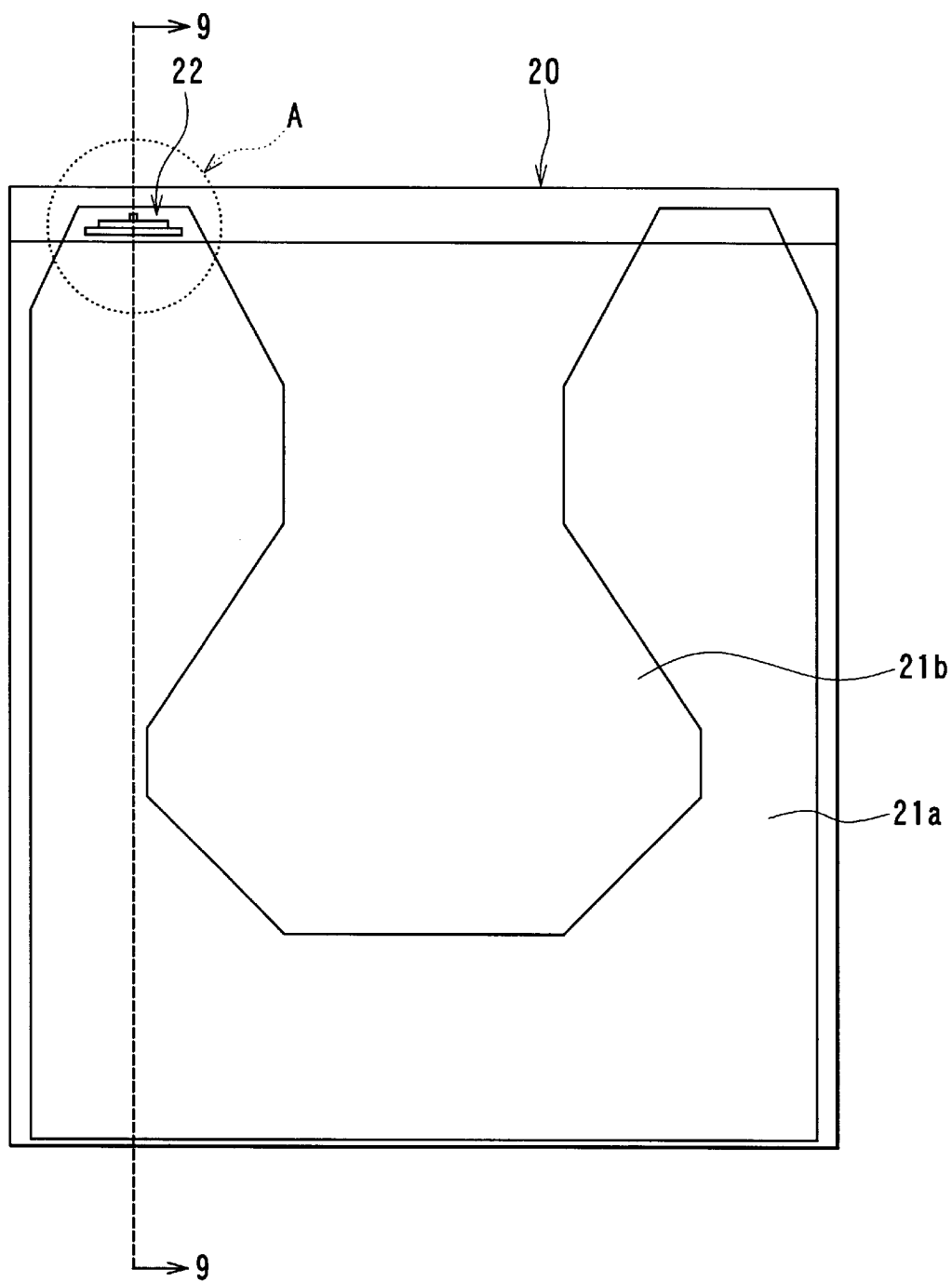
FIG. 8 is a bottom view illustrating an example of the configuration of the air bearing surface of the slider.

Reference is now made to FIG. 8 to describe an example of the slider to which the method of manufacturing sliders of the embodiment is applied. FIG. 8 is a bottom view that illustrates an example of the configuration of the air bearing surface of the slider. As shown, the air bearing surface of the slider 20 is shaped such that the slider 20 slightly floats over a recording medium such as a magnetic disk by means of the airflow generated by rotation of the medium. In FIG. 8 numeral 21a indicates a convex portion and numeral 21b indicates a concave portion. A thin-film magnetic head element 22 is located near the air-outflow-side end of the air bearing surface of the slider 20 (that is, on the upper side of FIG. 8). The configuration of the head element 22 is shown in FIG. 6A and FIG. 6B, for example. Portion A of FIG. 8 corresponds to FIG. 6B.

Figure 9:
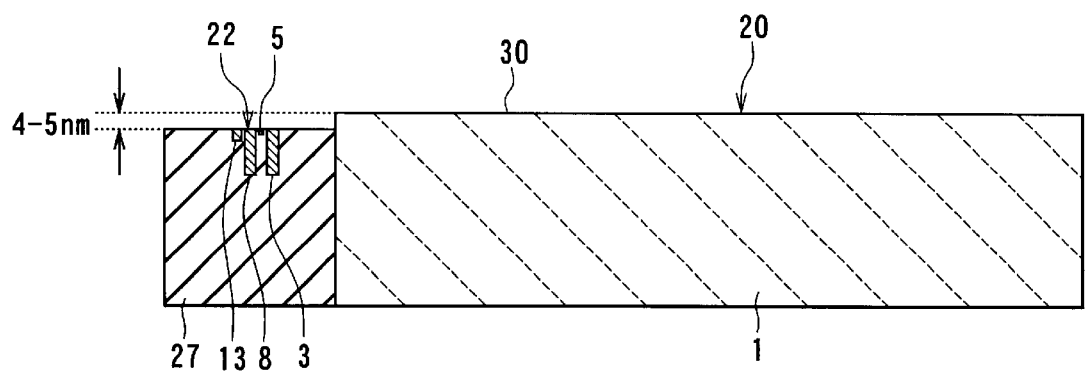
FIG. 9 is a cross section for illustrating a step in a method of manufacturing sliders of a first embodiment of the invention.
Figure 10:
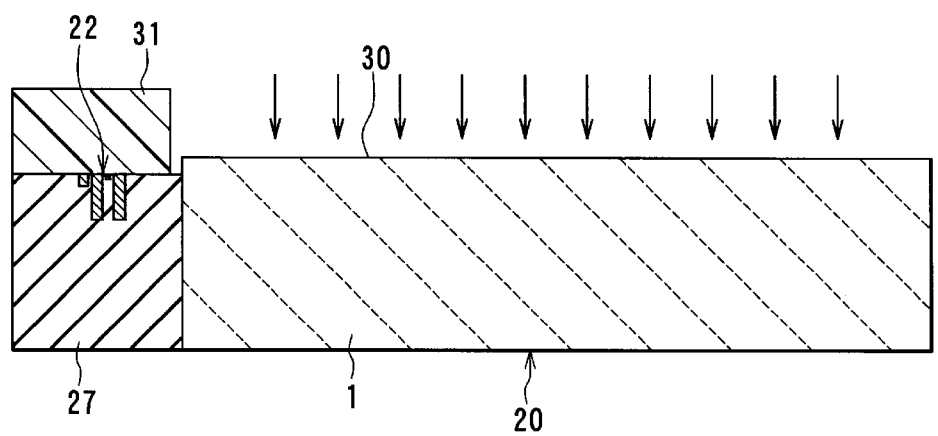
FIG. 10 is a cross section for illustrating a step that follows FIG. 9.
Figure 11:
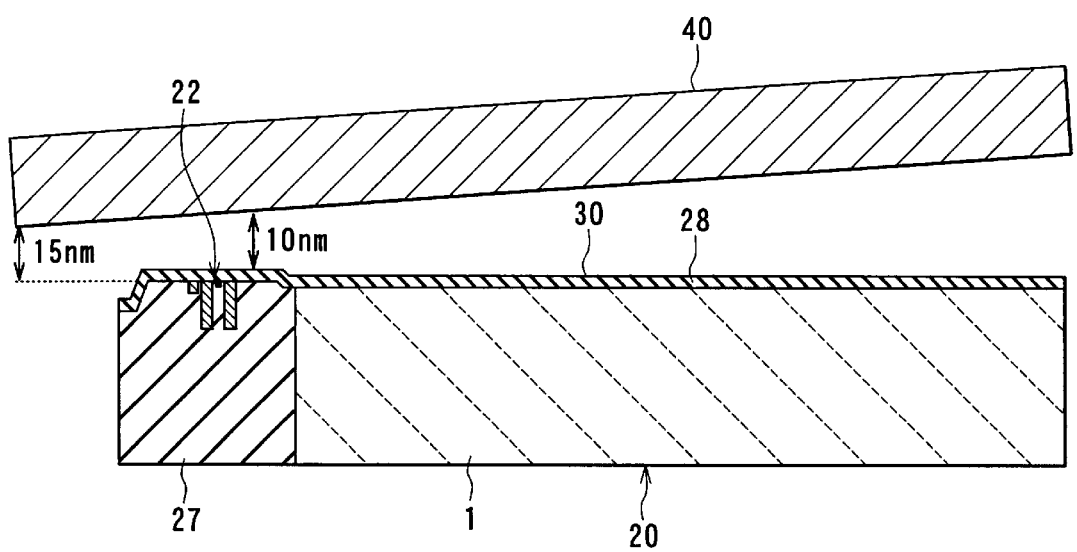
FIG. 11 is a cross section for illustrating a step that follows FIG. 10 and illustrates the slider slightly floating over the surface of a recording medium.

Reference is now made to FIG. 9 to FIG. 11 to describe the method of manufacturing sliders of the embodiment. FIG. 9 is a cross section for illustrating a step of the manufacturing method. FIG. 10 is a cross section for illustrating a step that follows FIG. 9. FIG. 11 is a cross section for illustrating a step that follows FIG. 10 and illustrates a slider slightly floating over the surface of a recording medium. FIG. 9 to FIG. 11 are cross sections taken along line 9—9 of FIG. 8, wherein only the main part of the head element 22 is shown.

In the method of the embodiment a wafer utilized includes a plurality of rows of portions to be sliders 20 (hereinafter called slider portions) each of which includes the thin-film magnetic head element 22. This wafer is cut in one direction to form blocks called bars each of which includes a row of slider portions. Each of the bars corresponds to the slider material of the invention.

Next, as shown in FIG. 9, each of the bars including the portions to be the sliders 20 is lapped to form the air bearing surface 30. The greater part of the slider 20 is made up of the substrate 1 of aluminum oxide and titanium carbide, for example. The rest of the slider 20 is made up of the insulating layer 27 of alumina, for example, and the head element 22 and so on formed in the insulating layer 27. The greater part of the insulating layer 27 is the overcoat layer 17.

After the above-stated lapping is performed on the slider 20, differences in level in the air bearing surface 30 result among the layers having different hardnesses. Lapping is performed on a rotating tin surface plate through the use of an abrasive which is alkaline slurry containing diamond to which an alkaline lubricant is added, for example. In this case, mechanical lapping is performed on the insulating layer 27 together with the bottom shield layer 3, the bottom pole layer 8 and the top pole layer 13 that are made of magnetic materials while chemical etching is performed on the insulating layer 27 made of alumina with the alkaline slurry. It is thereby possible that almost no difference in level is created between the insulating layer 27 and each of the bottom shield layer 3, the bottom pole layer 8 and the top pole layer 13.

It is impossible, however, through lapping with the above-mentioned alkaline slurry to eliminate the difference in the level between the insulating layer 27 and the substrate 1. A difference of about 4 to 5 nm in level is thus created between the insulating layer 27 and the substrate 1, the insulating layer 27 being located behind the substrate 1. In this case, the difference in level between the surface of the head element 22 located in the air bearing surface 30 and the surface of the substrate 1 located in the air bearing surface 30 is about 4 to 5 nm.

In the following step of this embodiment, as shown in FIG. 10, a photoresist film 31 is selectively formed on the portion of the air bearing surface 30 of the slider 20, the portion corresponding to the head element 22 and the insulating layer 27. Next, etching is performed to etch a portion of the air bearing surface 30 with the photoresist film 31 as a mask. This etching is preferably dry etching such as ion milling or reactive ion etching. The amount of this etching is 5 nm, for example, that is equal to or greater than the difference in level between the surface of the head element 22 closer to the air bearing surface 30 and the surface of the substrate 1 closer to the air bearing surface 30. In this embodiment the substrate 1 is etched in this step of etching the portion of the air bearing surface 30.

As shown in FIG. 11, the above-described etching achieves a reduction in the difference in level between the portion corresponding to the head element 22 and the portion corresponding to the substrate 1 in the air bearing surface 30 of the slider 20 before the protection film 28 is formed. Alternatively, the portion corresponding to the head element 22 is located closer to a recording medium 40 than at least a part of the portion corresponding to the substrate 1. In order to decrease the difference in level between the portion corresponding to the head element 22 and the portion corresponding to the substrate 1, it is preferred that these portions are located in one plane.

Next, a convex portion 21a and a concave portion 21b as shown in FIG. 8, for example, are formed in the air bearing surface 30 of the slider 20. The air bearing surface 30 is thus shaped such that the slider 20 slightly floats over the recording medium by means of the airflow generated by rotation of the medium.

Next, as shown in FIG. 11, the protection film 28 is formed over the entire surface of the air bearing surface 30 to protect the head element 22. The protection film 28 may be made of diamond-like carbon (DLC).

Finally, the bar is divided into sliders 20. In the step of forming the convex portion 21a and the concave portion 21b in the air bearing surface 30 of this embodiment, as shown in FIG. 11, a portion of the edge of the air bearing surface 30 is chamfered, the portion being located on the air-outflow side in the neighborhood of the head element 22 (that is, on the left side of FIG. 11).

Figure 30:
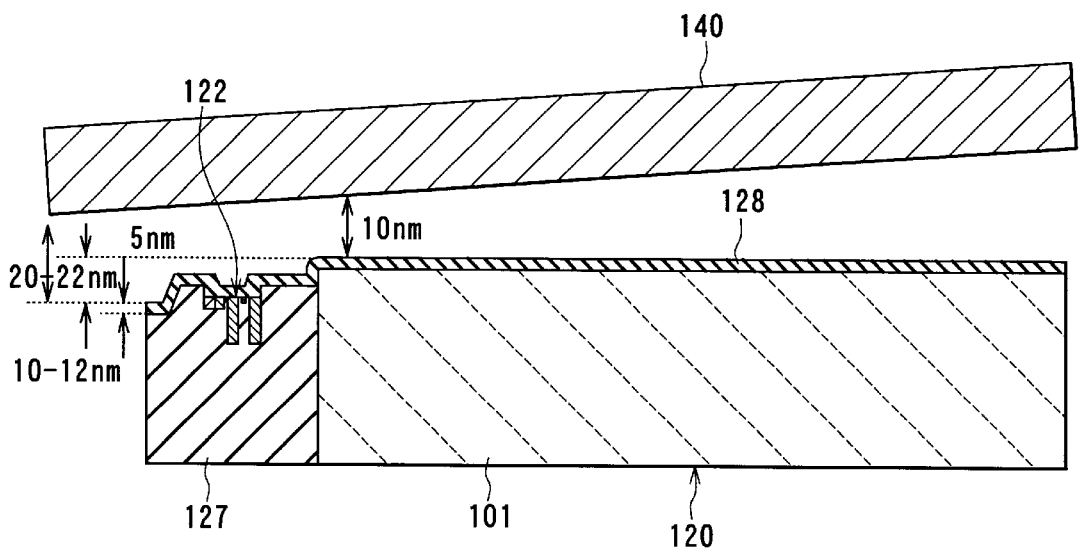
FIG. 30 is a cross section for illustrating the slider slightly floating over the surface of the recording medium.

In the case of the slider 20 manufactured through the method of the embodiment, if the thickness of the protection film 28 is 5 nm and the distance between the slider 20 and the medium 40 when the slider 20 is flying is 10 nm, as shown in FIG. 11, the magnetic space, that is, the distance between the medium 40 and the surface of the head element 22 closer to the air bearing surface 30 when the slider 22 is flying, is 15 nm. The magnetic space attained by the slider 20 is at least 5 nm smaller than the magnetic space of the related-art slider 120 shown in FIG. 30.

According to the embodiment thus described, etching is performed on the portion of the air bearing surface 30 of the slider 20 before the protection film 28 is formed, such that a reduction is made in the difference in level between the portion corresponding to the head element 22 and the portion corresponding to the substrate 1, or such that the portion corresponding to the head element 22 is located closer to the medium 40 than at least a part of the portion corresponding to the substrate 1. The protection film 28 is then formed over the entire air bearing surface 30.

Figure 12:
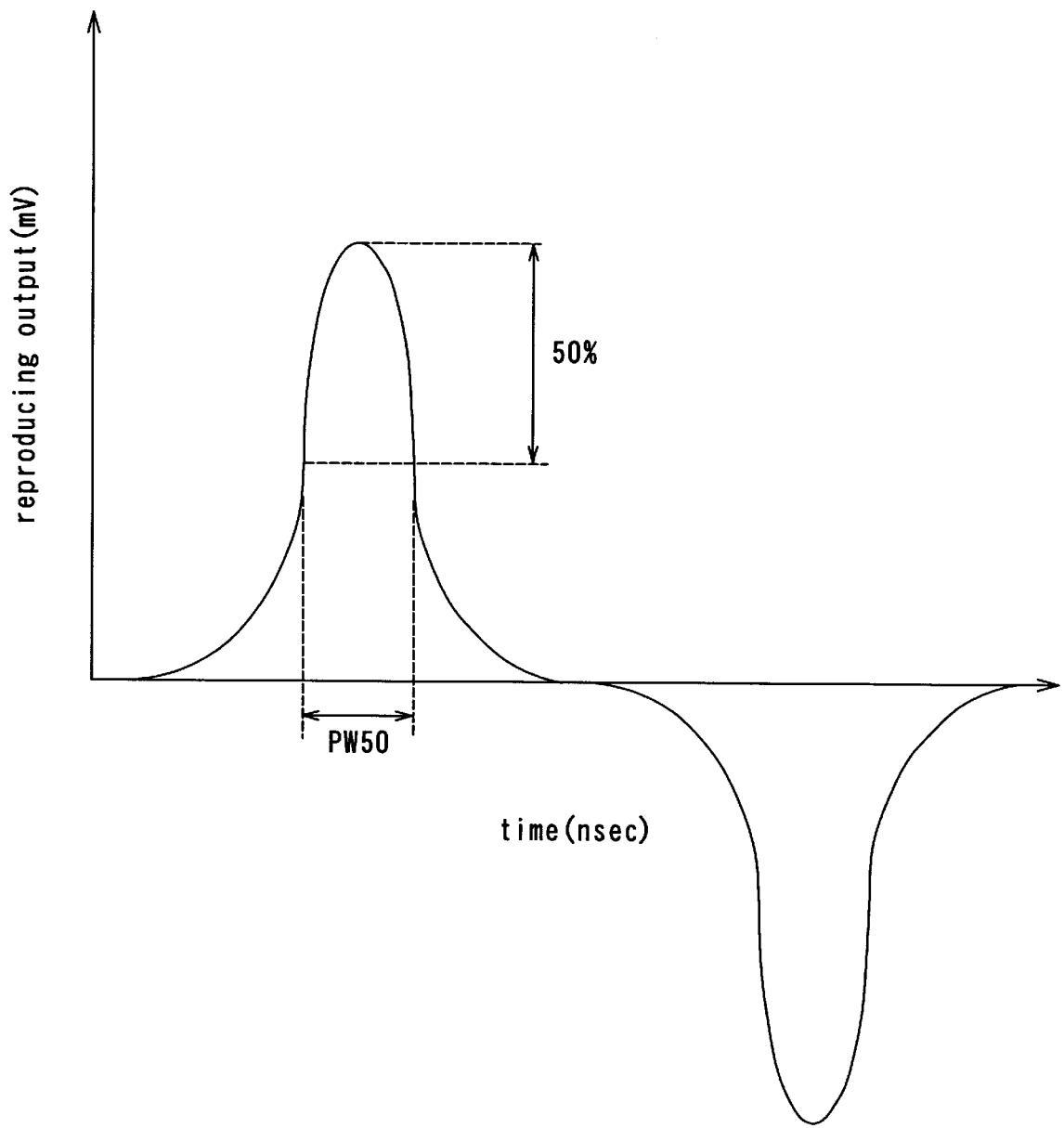
FIG. 12 is a plot for illustrating an example of the waveform of reproducing output of the thin-film magnetic head element of the slider manufactured through the method of the first embodiment.

As a result, according to the embodiment, no difference or almost no difference in level is created between the surface of the head element 22 closer to the air bearing surface 30 and the surface of the substrate 1 closer to the air bearing surface 30. Alternatively, the surface of the head element 22 closer to the air bearing surface 30 is located closer to the medium 40 than the surface of the substrate 1 closer to the air bearing surface 30. As a result, the low-flying slider 20 is achieved, that is, a reduction in the magnetic space is attained. According to the embodiment, the reduction in the magnetic space allows an improvement in the reproducing output and a reduction in half width of the reproducing head. It is thereby possible to improve the recording density. FIG. 12 shows an example of the waveform of reproducing output of the head element 22 of the slider 20 manufactured through the method of the embodiment. In FIG. 12 'PW50' indicates the half width of the reproducing output. The half width PW50 is the time required for the reproducing output to reach 50 percent or greater of the peak value.

According to the embodiment, the reduction in the magnetic space achieves an improvement in the overwrite property of the recording head.

According to the embodiment, a portion of the air bearing surface 30 of the slider 20 is etched. It is thereby possible to form the air bearing surface 30 into a desired shape, such as the shape in which the portion of the air bearing surface 30 corresponding to the head element 22 is located closer to the medium 40 than the portion of the air bearing surface 30 corresponding to the substrate 1.

According to the embodiment, the amount of floating of the slider 20 is further reduced since the portion of the edge of the air bearing surface 30 is chamfered, the portion being located on the air-outflow side in the neighborhood of the head element 22 (that is, on the left side of FIG. 11).

Second Embodiment

Figure 13:
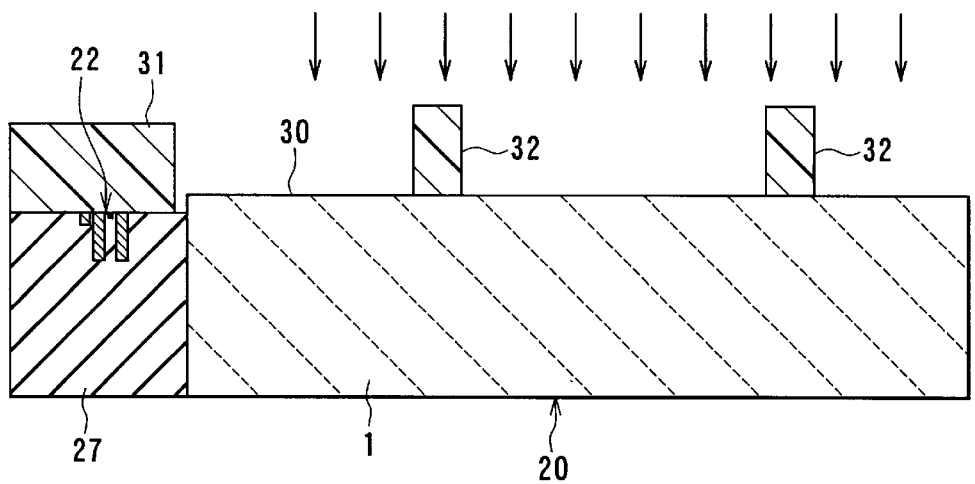
FIG. 13 is a cross section for illustrating a step in a method of manufacturing sliders of a second embodiment of the invention.
Figure 14:
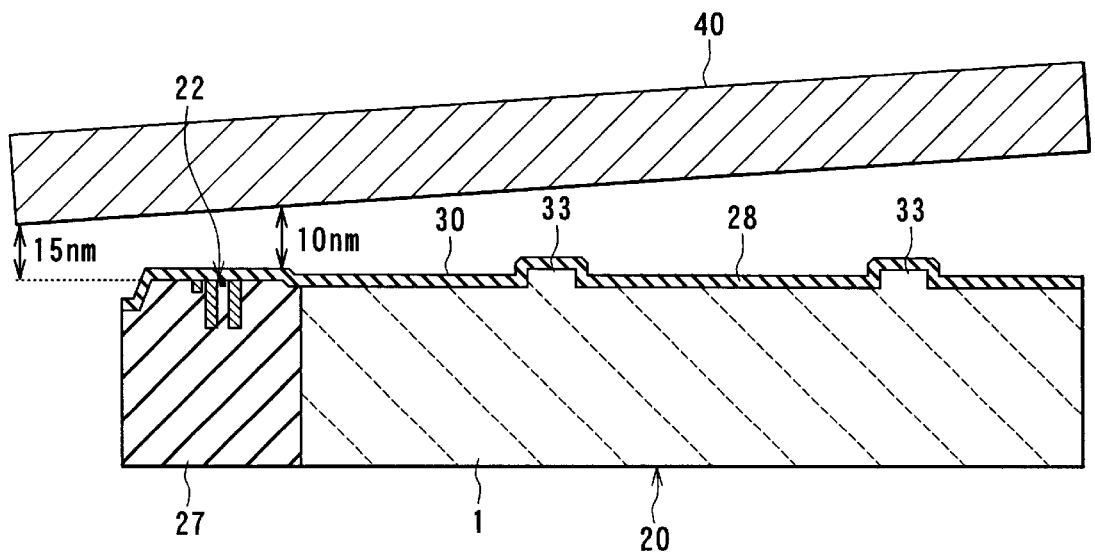
FIG. 14 is a cross section for illustrating a step that follows FIG. 13 and illustrates the slider slightly floating over the surface of the recording medium.

Reference is now made to FIG. 13 and FIG. 14 to describe a method of manufacturing sliders of a second embodiment of the invention. FIG. 13 is a cross section for illustrating a step of the manufacturing method. FIG. 14 is a cross section for illustrating a step that follows FIG. 13 and illustrates a slider slightly floating over the surface of a recording medium. FIG. 13 and FIG. 14 are cross sections taken along line 9—9 of FIG. 8, wherein only the main part of the head element 22 is shown.

The steps of the method of this embodiment taken until lapping is performed on the bar including the portions to be the sliders 20 to form the air bearing surface 30 are similar to the steps of the first embodiment, as shown in FIG. 9.

In the following step of this embodiment, as shown in FIG. 13, the photoresist film 31 is selectively formed on the portion of the air bearing surface 30 of the slider 20, the portion corresponding to the head element 22 and the insulating layer 27. At the same time, a photoresist film 32 is formed on a part of the portion of the air bearing surface 30 corresponding to the substrate 1. The photoresist film 32 is used for making convex portions described later that have the function of preventing sticking and so on.

Next, etching is performed to etch a portion of the air bearing surface 30 with the photoresist films 31 and 32 as masks. This etching is preferably dry etching such as ion milling or reactive ion etching. The amount of this etching is 5 nm, for example, that is equal to or greater than the difference in level between the surface of the head element 22 closer to the air bearing surface 30 and the surface of the substrate 1 closer to the air bearing surface 30. In this embodiment the substrate 1 is etched in this step of etching the portion of the air bearing surface 30.

Through the above-described etching, as shown in FIG. 14, convex portions 33 are formed in the parts of the portion of the air bearing surface 30 corresponding to the substrate 1, before the protection film 28 is formed. The convex portions 33 have the function of preventing sticking and so on. At the same time, a reduction is achieved in the difference in level between the portion corresponding to the head element 22 and the portion corresponding to the substrate 1 in the air bearing surface 30 before the protection film 28 is formed. Alternatively, the portion corresponding to the head element 22 is located closer to the recording medium 40 than at least a part of the portion corresponding to the substrate 1 (except the portion corresponding to the convex portions 33). In order to decrease the difference in level between the portion corresponding to the head element 22 and the portion corresponding to the substrate 1, it is preferred that these portions (except the portions corresponding to the convex portion 33) are located in one plane.

Next, the convex portion 21a and the concave portion 21b as shown in FIG. 8, for example, are formed in the air bearing surface 30 of the slider 20. The air bearing surface 30 is thus shaped such that the slider 20 slightly floats over the recording medium by means of the airflow generated by rotation of the medium.

Next, as shown in FIG. 14, the protection film 28 is formed over the entire surface of the air bearing surface 30 to protect the head element 22. The protection film 28 may be made of diamond-like carbon (DLC).

Finally, the bar is divided into the sliders 20. In the step of forming the convex portion 21a and the concave portion 21b in the air bearing surface 30 of this embodiment, too, as shown in FIG. 14, a portion of the edge of the air bearing surface 30 is chamfered, the portion being located on the air-outflow side in the neighborhood of the head element 22 (that is, on the left side of FIG. 14).

According to the embodiment, the portion of the air bearing surface 30 before the protection film 28 is formed is etched. As a result, the air bearing surface 30 is formed into a desired shape, such as the one having the convex portions 33 for preventing sticking, as shown in FIG. 14.

According to the embodiment, the convex portions 33 are formed in the parts of the portion of the air bearing surface 30 corresponding to the substrate 1. As a result, the convex portions 33 prevent the slider 20 from sticking to the recording medium 40 when the medium starts to rotate, and reduces a shock when the medium 40 rotating shifts to a stop of rotation, and the slider 20 touches the medium 40.

The remainder of configuration, functions and effects of the embodiment are similar to those of the first embodiment.

Third Embodiment

Figure 15:
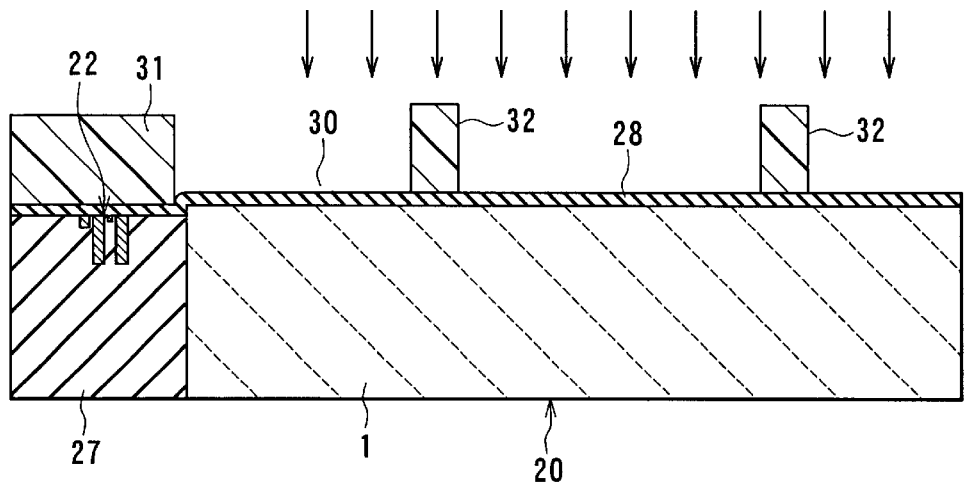
FIG. 15 is a cross section for illustrating a step in a method of manufacturing sliders of a third embodiment of the invention.
Figure 16:
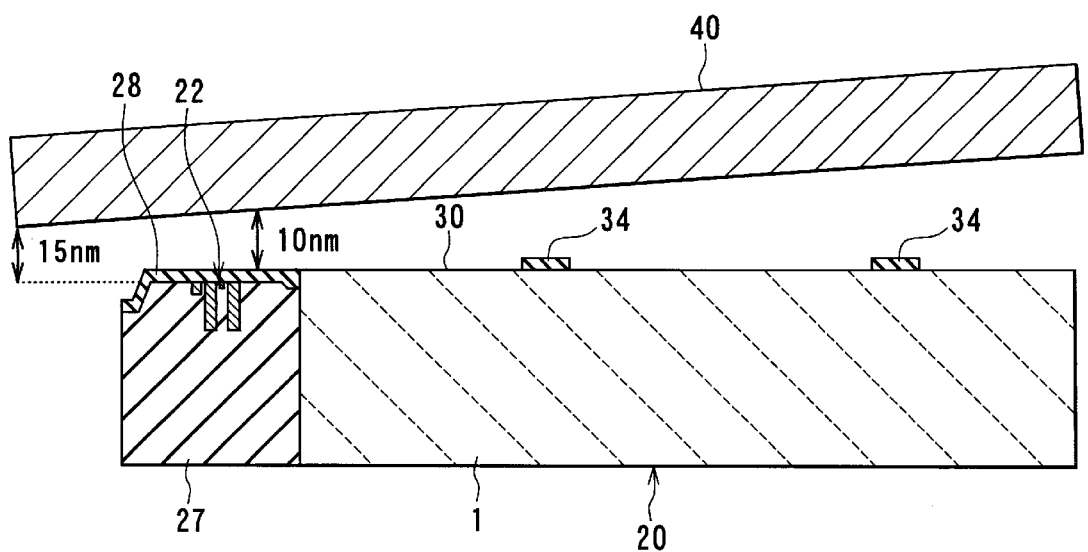
FIG. 16 is a cross section for illustrating a step that follows FIG. 15 and illustrates the slider slightly floating over the surface of the recording medium.

Reference is now made to FIG. 15 and FIG. 16 to describe a method of manufacturing sliders of a third embodiment of the invention. FIG. 15 is a cross section for illustrating a step of the manufacturing method. FIG. 16 is a cross section for illustrating a step that follows FIG. 15 and illustrates a slider slightly floating over the surface of a recording medium. FIG. 15 and FIG. 16 are cross sections taken along line 9—9 of FIG. 8, wherein only the main part of the head element 22 is shown.

The steps of the method of this embodiment taken until lapping is performed on the bar including the portions to be the sliders 20 to form the air bearing surface 30 are similar to the steps of the first embodiment, as shown in FIG. 9.

In the following step of this embodiment, as shown in FIG. 15, the protection film 28 is formed over the entire surface of the air bearing surface 30 to protect the head element 22. The protection film 28 may be made of diamond-like carbon (DLC). The thickness of the protection film 28 is 5 nm, for example, that is equal to or greater than the difference in level between the surface of the head element 22 closer to the air bearing surface 30 and the surface of the substrate 1 closer to the air bearing surface 30.

Next, the photoresist film 31 is selectively formed on the portion of the air bearing surface 30 of the slider 20, the portion corresponding to the head element 22 and the insulating layer 27. At the same time, the photoresist film 32 is formed on a part of the portion of the air bearing surface 30 corresponding to the substrate 1. The photoresist film 32 is used for making convex portions described later that have the function of preventing sticking and so on.

Next, etching is performed to etch a portion of the air bearing surface 30 with the photoresist films 31 and 32 as masks. This etching is preferably dry etching such as ion milling or reactive ion etching. The amount of this etching is 5 to 10 nm, for example, that is equal to or greater than the difference in level between the surface of the head element 22 closer to the air bearing surface 30 and the surface of the substrate 1 closer to the air bearing surface 30. In this embodiment the protection film 28 is etched in this step of etching the portion of the air bearing surface 30. The substrate 1 is further etched in this step in some cases.

Through the above-described etching, as shown in FIG. 16, convex portions 34 are formed in the parts of the portion of the air bearing surface 30 corresponding to the substrate 1. The convex portions 34 have the function of preventing sticking and so on. At the same time, a reduction is achieved in the difference in level between the portion corresponding to the head element 22 and the portion corresponding to the substrate 1 in the air bearing surface 30. Alternatively, the portion corresponding to the head element 22 is located closer to a recording medium than at least a part of the portion corresponding to the substrate 1 (except the portion corresponding to the convex portions 34). In order to decrease the difference in level between the portion corresponding to the head element 22 and the portion corresponding to the substrate 1, it is preferred that these portions (except the portion corresponding to the convex portions 34) are located in one plane.

Next, the convex portion 21a and the concave portion 21b as shown in FIG. 8, for example, are formed in the air bearing surface 30 of the slider 20. The air bearing surface 30 is thus shaped such that the slider 20 slightly floats over the recording medium by means of the airflow generated by rotation of the medium.

Finally, the bar is divided into the sliders 20. In the step of forming the convex portion 21a and the concave portion 21b in the air bearing surface 30 of this embodiment, too, as shown in FIG. 16, a portion of the edge of the air bearing surface 30 is chamfered, the portion being located on the air-outflow side in the neighborhood of the head element 22 (that is, on the left side of FIG. 16).

In the case of the slider 20 manufactured through the method of the third embodiment, if the thickness of the protection film 28 is 5 nm and the distance between the slider 20 and the medium 40 when the slider 20 is flying is 10 nm, as shown in FIG. 16, the magnetic space, that is, the distance between the medium 40 and the surface of the head element 22 closer to the air bearing surface 30 when the slider 22 is flying, is 15 nm. The magnetic space attained by the slider 20 is at least 5 nm smaller than the magnetic space of the related-art slider 120 shown in FIG. 30.

According to the embodiment thus described, the portion of the protection film 28 is etched after the protection film 28 is formed on the air bearing surface 30 having differences in level, such that a reduction is achieved in the difference in level between the portion corresponding to the head element 22 and the portion corresponding to the substrate 1 in the air bearing surface 30, or such that the portion corresponding to the head element 22 is located closer to the medium 40 than at least a part of the portion corresponding to the substrate 1 (except the portions corresponding to the convex portions 34).

As a result, according to the embodiment, no difference or almost no difference in level is created between the surface of the head element 22 including the protection film 28, the surface being closer to the air bearing surface 30, and the surface of the substrate 1 closer to the air bearing surface 30. Alternatively, the surface of the head element 22 including the protection film 28, the surface being closer to the air bearing surface 30, is located closer to the medium 40 than the surface of the substrate 1 closer to the air bearing surface 30. As a result, the low-flying slider 20 is achieved, that is, a reduction in the magnetic space is attained as in the first embodiment. According to the embodiment, the reduction in the magnetic space allows an improvement in the reproducing output and a reduction in half width of the reproducing head. It is thereby possible to improve the recording density.

According to the embodiment, the portion of the air bearing surface 30 is etched. As a result, the air bearing surface 30 is formed into a desired shape, such as the one having the convex portions 34 for preventing sticking, as shown in FIG. 16.

According to the embodiment, the convex portions 34 are formed in the parts of the portion of the air bearing surface 30 corresponding to the substrate 1. As a result, the convex portions 34 prevent the slider 20 from sticking to the recording medium 40 when the medium 40 starts to rotate, and reduces a shock when the medium 40 rotating shifts to a stop of rotation, and the slider 20 touches the medium 40.

The remainder of configuration, functions and effects of the embodiment are similar to those of the first embodiment.

Fourth Embodiment

Figure 17:
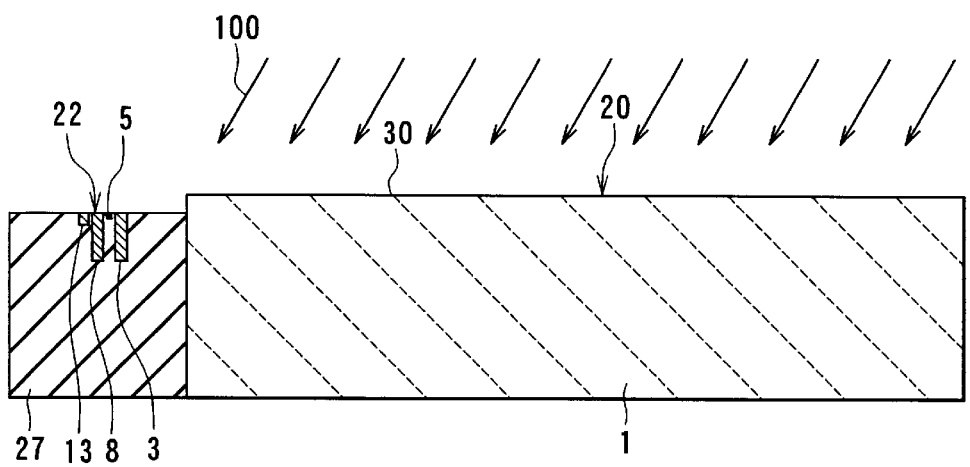
FIG. 17 is a cross section for illustrating a step in a method of manufacturing sliders of a fourth embodiment of the invention.
Figure 18:
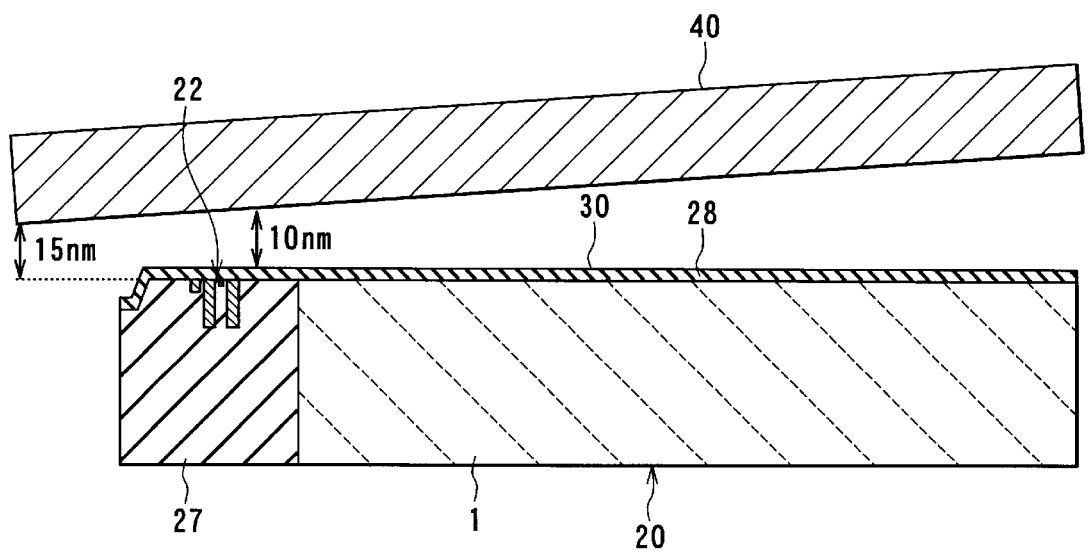
FIG. 18 is a cross section for illustrating a step that follows FIG. 17 and illustrates the slider slightly floating over the surface of the recording medium.

Reference is now made to FIG. 17 and FIG. 18 to describe a method of manufacturing sliders of a fourth embodiment of the invention. FIG. 17 is a cross section for illustrating a step of the manufacturing method. FIG. 18 is a cross section for illustrating a step that follows FIG. 17 and illustrates a slider slightly floating over the surface of a recording medium. FIG. 17 and FIG. 18 are cross sections taken along line 9—9 of FIG. 8, wherein only the main part of the head element 22 is shown.

The steps of the method of this embodiment taken until lapping is performed on the bar including the portions to be the sliders 20 to form the air bearing surface 30 are similar to the steps of the first embodiment, as shown in FIG. 9.

In the following step of this embodiment, as shown in FIG. 17, at least a portion of the air bearing surface 30 of the slider 20 is etched through the use of focused ion beam (FIB) 100, so as to reduce the difference in level between the portion corresponding to the head element 22 and the rest of the air bearing surface 30. Etching with the FIB 100 may be performed either on only the portion of the air bearing surface 30 corresponding to the substrate 1, or on the entire air bearing surface 30.

If etching with the FIB 100 is performed on only the portion of the air bearing surface 30 corresponding to the substrate 1, alignment of the FIB 100 is made with reference to the interface between the substrate 1 and the insulating layer 27 in the air bearing surface 30. Next, scanning is performed with the FIB 100 to etch the substrate 1. The direction of scanning may be the lateral direction of FIG. 17, the direction orthogonal to the drawing sheet of FIG. 17 or any other direction. The amount of etching of the substrate 1 with the FIB 100 is 5 nm, for example, that is equal to or nearly equal to the difference in level between the surface of the head element 22 closer to the air bearing surface 30 and the surface of the substrate 1 closer to the air bearing surface 30.

If etching with the FIB 100 is performed on the entire air bearing surface 30, alignment of the FIB 100 is made with reference to the air-outflow-side end of the air bearing surface 30 (on the left side of FIG. 17). Next, scanning is performed with the FIB 100 to etch the entire air bearing surface 30. In this case, the difference in level is made in the air bearing surface 30 at first while the head element 22 and the insulating layer 27 are recessed behind the substrate 1. Therefore, almost only the substrate 1 is etched with the FIB 100 until this difference in level is eliminated. After the difference is eliminated, the substrate 1, the head element 22 and the insulating layer 27 are etched. The direction of scanning may be the lateral direction of FIG. 17, the direction orthogonal to the drawing sheet of FIG. 17 or any other direction. The amount of etching of the substrate 1 with the FIB 100 is 5 nm, for example, that is equal to or nearly equal to the difference in level between the surface of the head element 22 closer to the air bearing surface 30 and the surface of the substrate 1 closer to the air bearing surface 30. If the head element 22 and the insulating layer 27 are also etched with the FIB 100, the amount of etching is greater than the above-mentioned difference in level.

If the head element 22 and the insulating layer 27 are also etched with the FIB 100, the MR height and the throat height may be controlled by controlling the amount of etching. The MR height is the length (height) of the MR element 5 between an end thereof located in the air bearing surface 30 and the other end. The throat height is the length (height) of the pole portion of the recording head between an end of the pole portion located in the air bearing surface 30 and the other end.

Through the above-described etching with the FIB 100, as shown in FIG. 18, no difference or almost no difference in level is created between the substrate 1 and each of the head element 22 and the insulating layer 27 in the air bearing surface 30 before the protection film 28 is formed. The flatness of the entire air bearing surface 30 is thereby improved.

Next, the convex portion 21a and the concave portion 21b as shown in FIG. 8, for example, are formed in the air bearing surface 30 of the slider 20. The air bearing surface 30 is thus shaped such that the slider 20 slightly floats over the recording medium by means of the airflow generated by rotation of the medium.

Next, as shown in FIG. 18, the protection film 28 is formed over the entire surface of the air bearing surface 30 to protect the head element 22. The protection film 28 may be made of diamond-like carbon (DLC). The thickness of the protection film 28 is 3 to 5 nm, for example.

Finally, the bar is divided into the sliders 20. In the step of forming the convex portion 21a and the concave portion 21b in the air bearing surface 30 of this embodiment, as shown in FIG. 18, a portion of the edge of the air bearing surface 30 is chamfered, the portion being located on the air-outflow side in the neighborhood of the head element 22 (that is, on the left side of FIG. 18).

In the case of the slider 20 manufactured through the method of the embodiment, if the thickness of the protection film 28 is 5 nm and the distance between the slider 20 and the medium 40 when the slider 20 is flying is 10 nm, as shown in FIG. 18, the magnetic space, that is, the distance between the medium 40 and the surface of the head element 22 closer to the air bearing surface 30 when the slider 22 is flying, is 15 nm. The magnetic space attained by the slider 20 is about 5 to 7 nm smaller than the magnetic space of the related-art slider 120 shown in FIG. 30.

According to the embodiment thus described, etching with the FIB 100 is performed on at least a portion of the air bearing surface 30 of the slider 20 before the protection film 28 is formed, such that a reduction is made in the difference in level between the portion corresponding to the head element 22 and the rest of the air bearing surface 30. The protection film 28 is then formed over the entire air bearing surface 30.

As a result, according to the embodiment, no difference or almost no difference in level is created between the surface of the head element 22 closer to the air bearing surface 30 and the surface of the substrate 1 closer to the air bearing surface 30. As a result, the low-flying slider 20 is achieved, that is, a reduction in the magnetic space is attained. According to the embodiment, the reduction in the magnetic space allows an improvement in the reproducing output and a reduction in half width of the reproducing head. It is thereby possible to improve the recording density. FIG. 12 shows an example of the waveform of reproducing output of the head element 22 of the slider 20 manufactured through the method of the embodiment.

According to the embodiment, the reduction in the magnetic space achieves an improvement in the overwrite property of the recording head.

According to the embodiment, at least a portion of the air bearing surface 30 of the slider 20 is etched with the FIB 100. It is thereby possible to form the air bearing surface 30 into a desired shape, such as the shape in which the portion of the air bearing surface 30 corresponding to the head element 22 is located closer to the medium 40 than the portion of the air bearing surface 30 corresponding to the substrate 1.

According to the embodiment, the amount of floating of the slider 20 is further reduced since the portion of the edge of the air bearing surface 30 is chamfered, the portion being located on the air-outflow side in the neighborhood of the head element 22 (that is, on the left side of FIG. 18).

According to the embodiment, the head element 22 and the insulating layer 27 are etched with the FIB 100, and the amount of etching is controlled, so that the MR height and the throat height are controlled. Precise control of the MR height and the throat height is thereby achieved.

According to the embodiment, alignment of the FIB 100 is performed with reference to the air-outflow-side end of the air bearing surface 30, for example. The entire air bearing surface 30 is then etched through scanning with the FIB 100. As a result, the flatness of the air bearing surface 30 is improved, compared to the surface lapped through the use of a surface plate.

Fifth Embodiment

Figure 19:
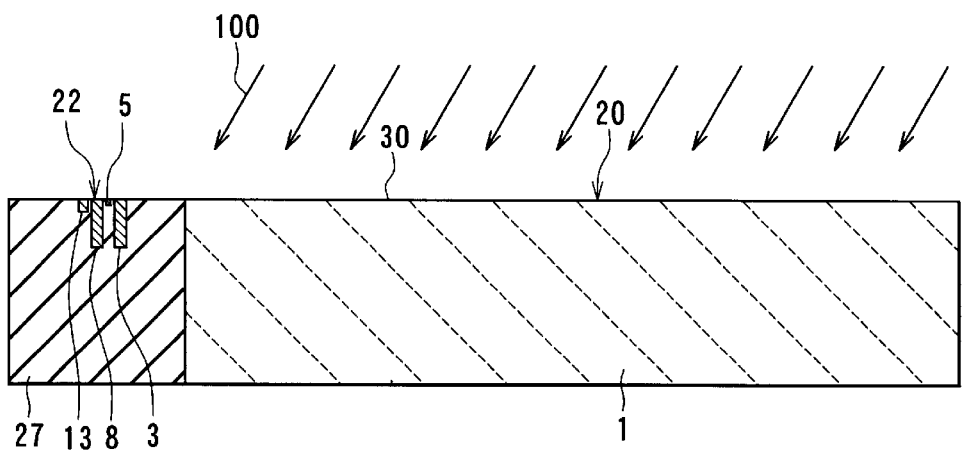
FIG. 19 is a cross section for illustrating a step in a method of manufacturing sliders of a fifth embodiment of the invention.
Figure 20:
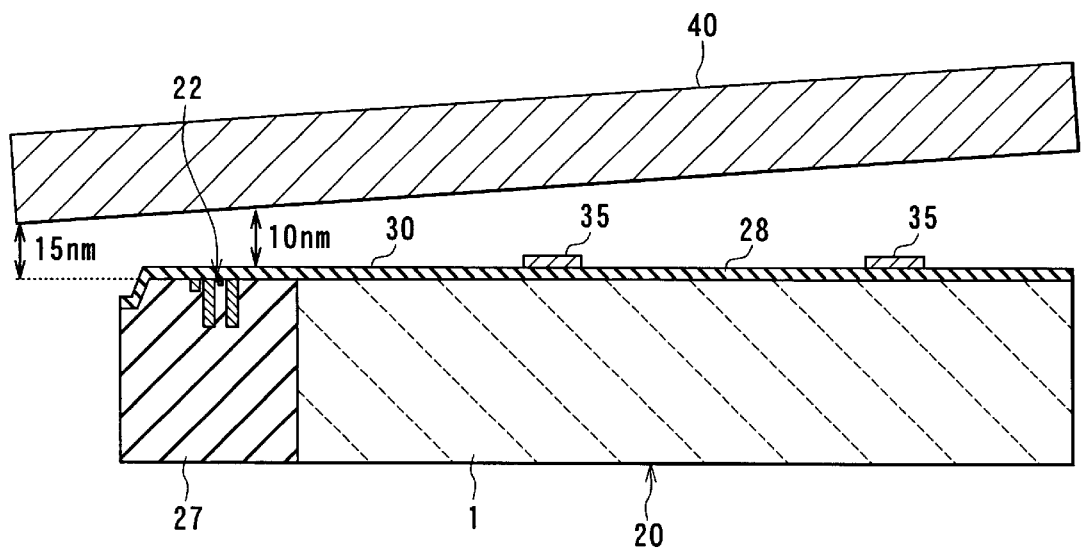
FIG. 20 is a cross section for illustrating a step that follows FIG. 19 and illustrates the slider slightly floating over the surface of the recording medium.

Reference is now made to FIG. 19 and FIG. 20 to describe a method of manufacturing sliders of a fifth embodiment of the invention. FIG. 19 is a cross section for illustrating a step of the manufacturing method. FIG. 20 is a cross section for illustrating a step that follows FIG. 19 and illustrates a slider slightly floating over the surface of a recording medium. FIG. 19 and FIG. 20 are cross sections taken along line 9—9 of FIG. 8, wherein only the main part of the head element 22 is shown.

The method of this embodiment includes steps similar to the steps of he fourth embodiment taken until lapping is performed on the bar including the portions to be the sliders 20 to form the air bearing surface 30, as shown in FIG. 9, and at least a portion of the air bearing surface 30 of each of the sliders 20 is etched through the use of the FIB 100, so as to reduce the difference in level between the portion corresponding to the head element 22 and the rest of the air bearing surface 30, as shown in FIG. 19.

In the following step of this embodiment, the convex portion 21a and the concave portion 21b as shown in FIG. 8, for example, are formed in the air bearing surface 30 of the slider 20. The air bearing surface 30 is thus shaped such that the slider 20 slightly floats over the recording medium by means of the airflow generated by rotation of the medium.

Next, as shown in FIG. 20, the protection film 28 is formed over the entire surface of the air bearing surface 30 to protect the head element 22. The protection film 28 may be made of diamond-like carbon (DLC).

Next, convex portions 35 is formed through the liftoff method, for example, on parts of the protection film 28 in the portion corresponding to the substrate 1. The convex portions 35 have the function of preventing sticking and so on, and may be made of diamond-like carbon (DLC).

Finally, the bar is divided into the sliders 20. In the step of forming the convex portion 21a and the concave portion 21b in the air bearing surface 30 of this embodiment, as shown in FIG. 20, a portion of the edge of the air bearing surface 30 is chamfered, the portion being located on the air-outflow side in the neighborhood of the head element 22 (that is, on the left side of FIG. 20).

According to the embodiment, the convex portions 35 are formed in the parts of the portion of the air bearing surface 30 corresponding to the substrate 1. As a result, the convex portions 35 prevent the slider 20 from sticking to the recording medium 40 when the medium 40 starts to rotate, and reduces a shock when the medium 40 rotating shifts to a stop of rotation, and the slider 20 touches the medium 40.

The remainder of configuration, functions and effects of the embodiment are similar to those of the fourth embodiment.

Sixth Embodiment

Figure 21:
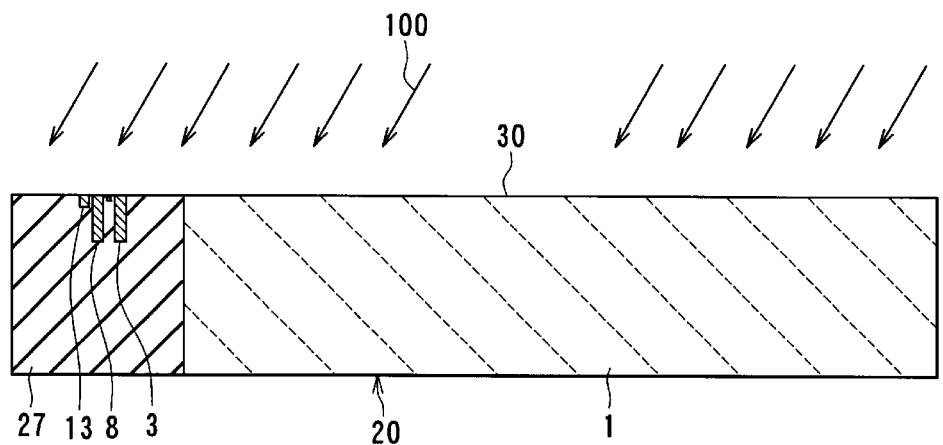
FIG. 21 is a cross section for illustrating a step in a method of manufacturing sliders of a sixth embodiment of the invention.
Figure 22:
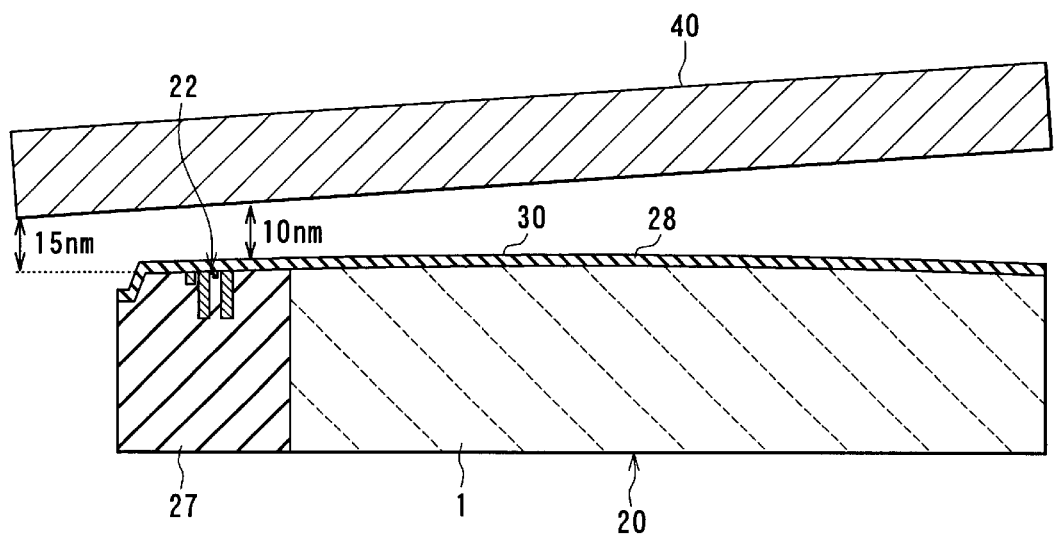
FIG. 22 is a cross section for illustrating a step that follows FIG. 21 and illustrates the slider slightly floating over the surface of the recording medium.
Figure 27:
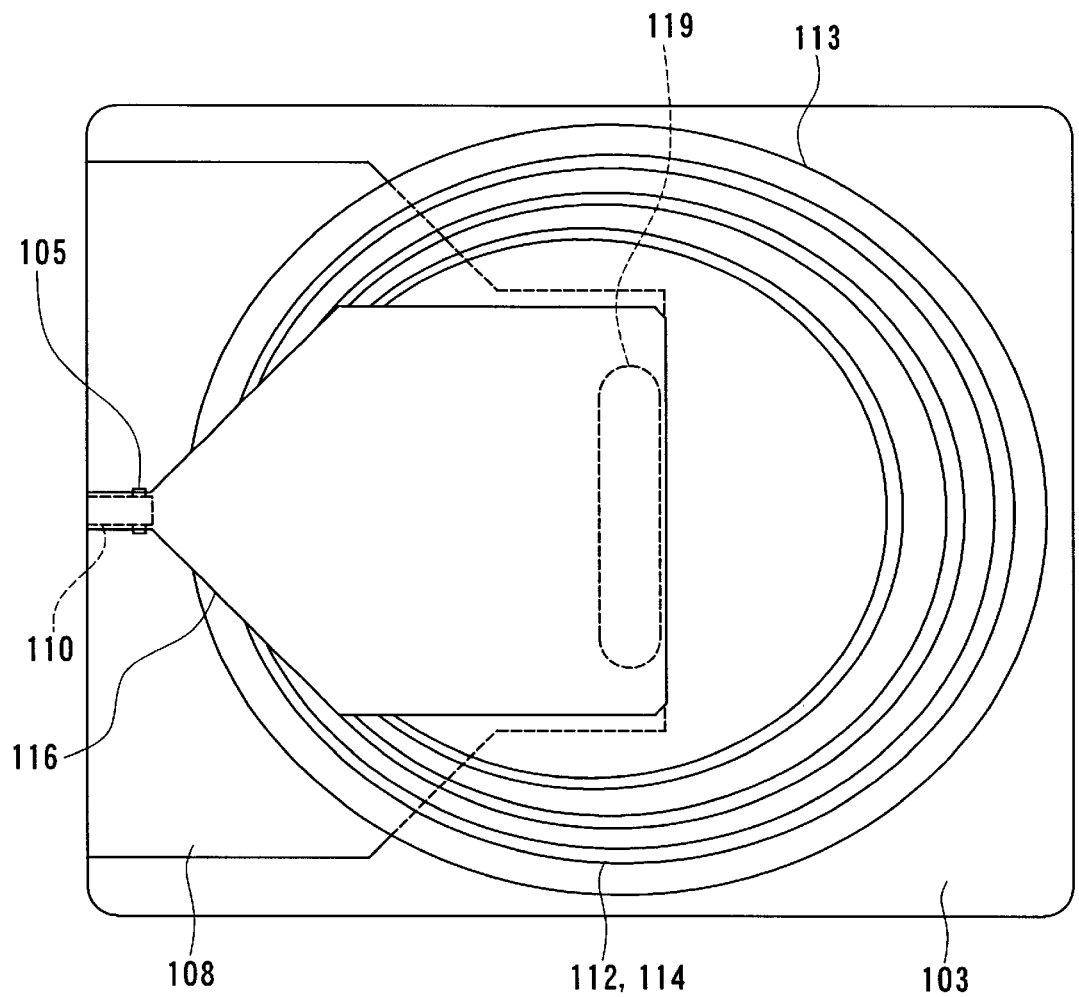
FIG. 27 is a top view of the related-art thin-film magnetic head element.
Figure 28:
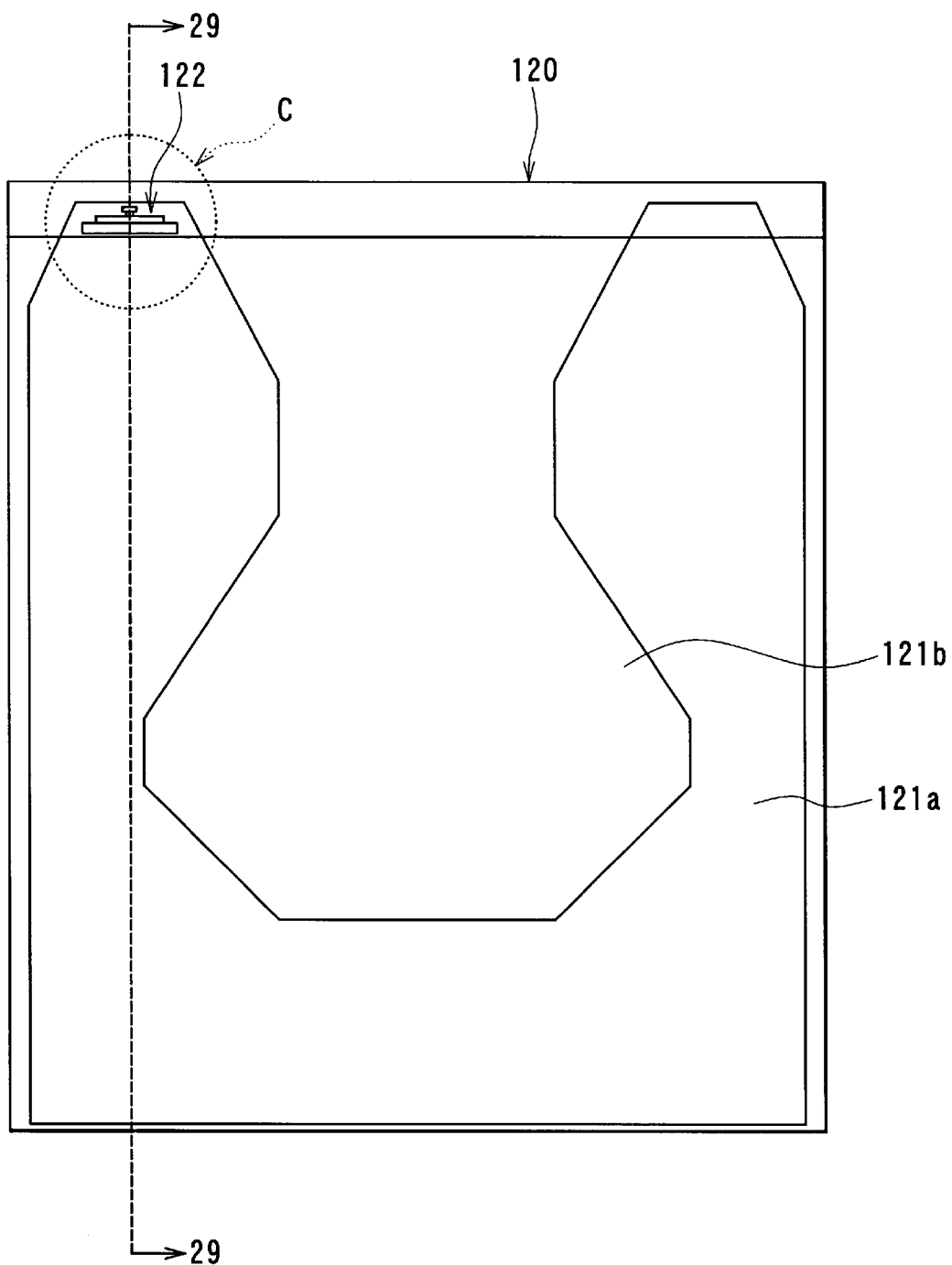
FIG. 28 is a bottom view illustrating an example of the configuration of the air bearing surface of the slider.
Figure 29:
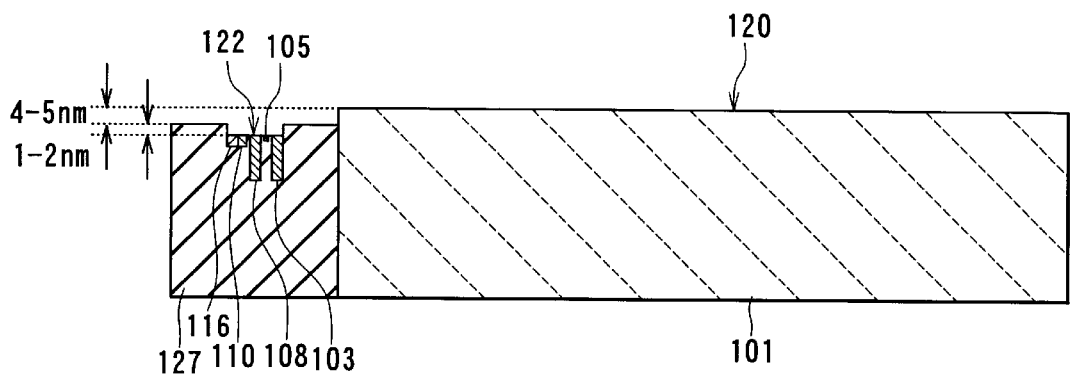
FIG. 29 is a cross section taken along line 29—29 of FIG. 28.

Reference is now made to FIG. 21 and FIG. 22 to describe a method of manufacturing sliders of a sixth embodiment of the invention. FIG. 21 is a cross section for illustrating a step of the manufacturing method. FIG. 22 is a cross section for illustrating a step that follows FIG. 21 and illustrates a slider slightly floating over the surface of a recording medium. FIG. 21 and FIG. 22 are cross sections taken along line 9—9 of FIG. 8, wherein only the main part of the head element 22 is shown.

The steps of the method of this embodiment taken until lapping is performed on the bar including the portions to be the sliders 20 to form the air bearing surface 30 are similar to the steps of the first embodiment, as shown in FIG. 9.

In the following step of this embodiment, as shown in FIG. 21, the entire air bearing surface 30 of the slider 20 is etched through the use of FIB 100. In this embodiment, the amount of etching with the FIB 100 is greater in the air-inflow-side end and the air-outflow-side end than the rest of the air bearing surface 30. As a result, the air bearing surface 30 is shaped such that the portion between the air-inflow-side end and the air-outflow-side end projects further toward the recording medium 40 (this shape is hereinafter called the crown shape). In this case, it is preferred that the air bearing surface 30 has the shape of the cylindrical surface, that is, an arc is formed between the air-inflow-side end and the air-outflow-side end, or the shape similar the cylindrical surface. Alternatively, any other shape such as a roof shape, a dome shape or a cone shape may be acceptable.

In the following step of this embodiment, the convex portion 21a and the concave portion 21b as shown in FIG. 8, for example, are formed in the air bearing surface 30 of the slider 20. The air bearing surface 30 is thus shaped such that the slider 20 slightly floats over the recording medium by means of the airflow generated by rotation of the medium.

Next, as shown in FIG. 22, the protection film 28 is formed over the entire surface of the air bearing surface 30 to protect the head element 22. The protection film 28 may be made of diamond-like carbon (DLC).

Finally, the bar is divided into the sliders 20. In the step of forming the convex portion 21a and the concave portion 21b in the air bearing surface 30 of this embodiment, as shown in FIG. 22, a portion of the edge of the air bearing surface 30 is chamfered, the portion being located on the air-outflow side in the neighborhood of the head element 22 (that is, on the left side of FIG. 22).

According to the embodiment, the air bearing surface 30 is etched with the FIB 100. As a result, the amount of etching with the FIB 100 is controlled portion by portion, so that the air bearing surface 30 is formed into a desired shape, such as the crown shape described above.

According to the embodiment, the air bearing surface 30 is crown-shaped. It is thereby possible to prevent the slider 20 from sticking to the recording medium 40 when the medium 40 starts to rotate, and to reduce a shock when the medium 40 rotating shifts to a stop of rotation, and the slider 20 touches the medium 40.

The remainder of configuration, functions and effects of the embodiment are similar to those of the fourth embodiment.

The present invention is not limited to the foregoing embodiments but may be practiced in still other ways. For example, the invention may be applied to a thin-film magnetic head dedicated to reading that has no induction-type electromagnetic transducer, a thin-film magnetic head dedicated to writing that has an induction-type electromagnetic transducer only, or a thin-film magnetic head that performs reading and writing with an induction-type electromagnetic transducer.

According to the method of manufacturing a slider o f the invention thus described, at least a part of the medium facing surface is etched, such that a reduction is achieved in difference in level between the portion of the medium facing surface corresponding to the head element and the rest of the medium facing surface, or such that the portion of the medium facing surface corresponding to the head element is located closer to the recording medium than at least a portion of the rest of the medium facing surface. As a result, the low-flying sliders are achieved, and it is possible to form the medium facing surface of the slider into a desired shape.

According to the method of the invention, the protection film may be formed over the medium facing surface, and the convex portion may be formed on the protection film. In this case, it is possible to prevent the slider from sticking to the recording medium.

According to the method of the invention, the convex portion may be formed on a part of the medium facing surface other than the portion corresponding to thin-film magnetic head element. It is thereby possible to prevent the slider from sticking to the recording medium.

According to the method of the invention, through etching with the focused ion beam, the medium facing surface may be shaped such that the portion thereof between the air-inflow-side end and the air-outflow-side end projects further toward the recording medium. It is thereby possible to prevent the slider from sticking to the recording medium.

According to the method of the invention, the length of the magnetoresistive element between an end thereof located in the medium facing surface and the other end may be controlled by etching with the focused ion beam. It is thereby possible to control this length with accuracy.

According to the method of the invention, the length of the pole portion between an end thereof located in the medium facing surface and the other end may be controlled by etching with the focused ion beam. It is thereby possible to control this length with accuracy.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a slider of a thin-film magnetic head, the slider including a medium facing surface that faces toward a recording medium and a thin-film magnetic head element located near the medium facing surface, the method comprising the steps of:
    forming the medium facing surface in a material used for making the slider, the material including the head element; and
    etching at least a part of the medium facing surface, such that a reduction is made in difference in level between a portion of the medium facing surface corresponding to the head element and the rest of the medium facing surface, or such that the portion of the medium facing surface corresponding to the head element is located closer to the recording medium than at least a portion of the rest of the medium facing surface.

2. The method according to claim 1 wherein the step of forming the medium facing surface includes lapping of a surface of the material to be the medium facing surface.

3. The method according to claim 1, further comprising the step of forming a protection film over the medium facing surface after the step of etching.

4. The method according to claim 3 wherein the protection film is made of diamond-like carbon.

5. The method according to claim 3, further including the step of forming a convex portion on the protection film.

6. The method according to claim 1, further comprising the step of forming a protection film over the medium facing surface after the step of forming the medium facing surface, wherein
    a portion of the protection film is etched in the step of etching.

7. The method according to claim 6 wherein the protection film is made of diamond-like carbon.

8. The method according to claim 6 wherein the protection film has a thickness greater than or equal to the difference in level between the portion of the medium facing surface before undergoing the step of etching, the portion corresponding to the head element, and at least a portion of the rest of the medium facing surface.

9. The method according to claim 1 wherein a convex portion is formed on the rest of the medium facing surface in the step of etching.

10. The method according to claim 1 wherein ion milling is used in the step of etching.

11. The method according to claim 1 wherein reactive ion etching is used in the step of etching.

12. The method according to claim 1 wherein etching is performed through the use of focused ion beam in the step of etching.

13. The method according to claim 12 wherein alignment of the focused ion beam is made with reference to an end of the medium facing surface in the step of etching.

14. The method according to claim 12 wherein, in the step of etching, the medium facing surface is shaped such that a portion thereof between an air-inflow-side end and an air-outflow-side end projects further toward the recording medium.

15. The method according to claim 14 wherein, in the step of etching, the medium facing surface is shaped such that an arc is formed between the air-inflow-side end and the air-outflow-side end.

16. The method according to claim 12 wherein: the head element includes a magnetoresistive element; and a length of the magnetoresistive element between an end thereof located in the medium facing surface and the other end is controlled in the step of etching.

17. The method according to claim 12 wherein: the head element includes: a first magnetic layer and a second magnetic layer magnetically coupled to each other each of which includes at least one layer, the first and second magnetic layers including magnetic pole portions opposed to each other and placed in regions on a side of the medium facing surface; a gap layer placed between the pole portions of the first and second magnetic layers; and a thin-film coil at least a part of which is placed between the magnetic layers and insulated from the magnetic layers; and a length of the pole portions between an end thereof located in the medium facing surface and the other end is controlled in the step of etching.

* * * * *